(12) United States Patent
Suleiman et al.

(10) Patent No.: US 9,873,759 B2
(45) Date of Patent: Jan. 23, 2018

(54) EPOXY COMPOSITE RESINS AND SOL-GEL COMPOSITIONS THEREOF

(71) Applicant: KING FAHD UNIVERSITY OF PETROLEUM AND MINERALS, Dhahran (SA)

(72) Inventors: Rami Khalid Suleiman, Dhahran (SA); Bassam Mohammad El Ali, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 120 days.

(21) Appl. No.: 14/951,123

(22) Filed: Nov. 24, 2015

(65) Prior Publication Data

US 2016/0312059 A1 Oct. 27, 2016

Related U.S. Application Data

(60) Provisional application No. 62/153,119, filed on Apr. 27, 2015.

(51) Int. Cl.
  *C08G 18/64* (2006.01)
  *C08G 18/75* (2006.01)
  *C09D 175/04* (2006.01)

(52) U.S. Cl.
  CPC ..... *C08G 18/6407* (2013.01); *C08G 18/6469* (2013.01); *C08G 18/755* (2013.01); *C09D 175/04* (2013.01)

(58) Field of Classification Search
  None
  See application file for complete search history.

(56) References Cited

U.S. PATENT DOCUMENTS

2008/0081120 A1 4/2008 Van Ooij et al.
2009/0011244 A1* 1/2009 Kishikawa ............ C03C 17/326
428/411.1

FOREIGN PATENT DOCUMENTS

EP 2088173 B1 2/2012

OTHER PUBLICATIONS

Suleiman et al. (RSC Adv., 2015, 5, 39155-39167).*

(Continued)

*Primary Examiner* — Vu A Nguyen
(74) *Attorney, Agent, or Firm* — Oblon, McClelland, Maier & Neustadt, L.L.P.

(57) ABSTRACT

Composite resins produced from chemical reactions among a polyglycol epoxide liquid epoxy resin, an aminosilane, tri- and/or tetra-alkoxysilanes and an isocyanate. The hybrid compositions are prepared by an in situ sol-gel process where components of the composition are mixed together sequentially. The composite resins are formed by a coupling reaction between the epoxide groups of the epoxy resin and the amino groups of the aminosilane. The silanes are hydrolyzed to form silanol groups which then undergo polycondensation to form an inorganic polymeric network of an intermediate. Finally, urethane moieties are introduced to the composite resins when unreacted hydroxyl groups from the intermediate react with the isocyanate. These composite resins are evaluated as protective coatings of mild steel substrates, including mechanical strength, anticorrosiveness in a saline medium, and adhesiveness to the mild steel substrates.

16 Claims, 22 Drawing Sheets

(56) References Cited

OTHER PUBLICATIONS

Suleiman, R., et al., "Novel Hybrid Epoxy Silicone Materials as Efficient Anticorrosive Coatings for Mild Steel", Royal Society of Chemistry Advances, vol. 5, pp. 39155-39167, (2015).

Chattopadhyay, D. K., et al., "Hybrid Coatings from Novel Silane-Modified Glycidyl Carbamate Resins and Amine Crosslinkers", Progress in Organic Coatings, vol. 66, pp. 73-85, (2009).

Naghash, H. J., et al., "Synthesis and Characterization of a Novel Hydroxy Terminated Polydimethylsiloxane and its Application in the Waterborne Polysiloxane—Urethane Dispersion for Potential Marine Coatings", Polymers Advanced Technologies, vol. 24, pp. 307-317, (2013).

Li W. et al., "Study the Factors Affecting the Performance of Organic—Inorganic Hybrid Coatings", Journal of Applied Polymer Science, 8 pages total, (2014).

Bakhshandeh, E., et at., "Anti-Corrosion Hybrid Coatings based on Epoxy—Silica Nano-Composites: Toward Relationship between the Morphology and EIS Data", Progress in Organic Coatings, vol. 77, pp. 1169-1183, (2014).

\* cited by examiner

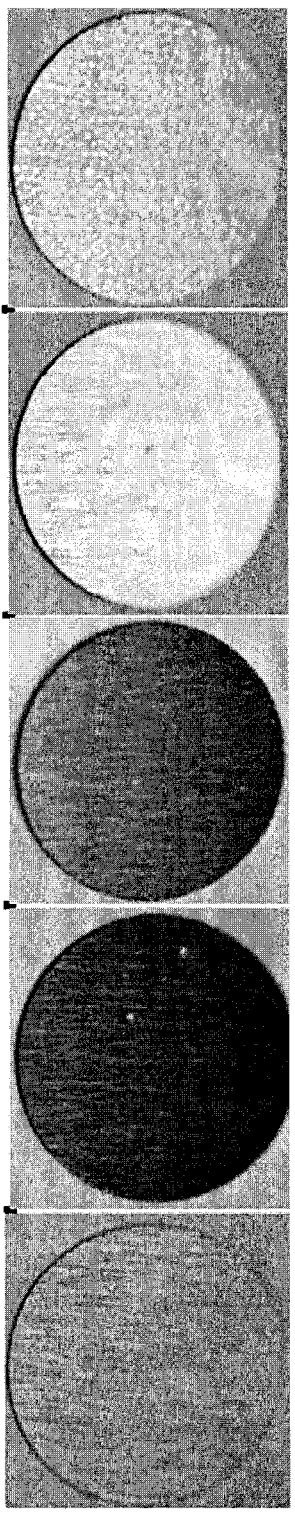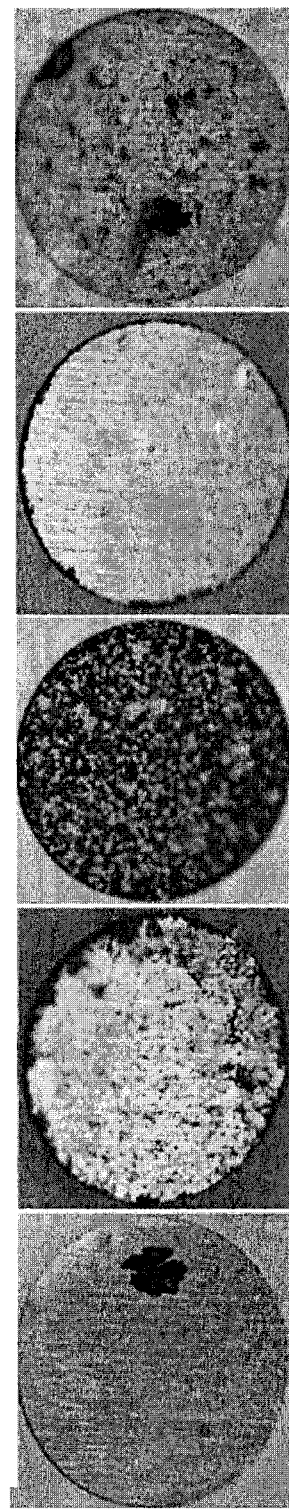

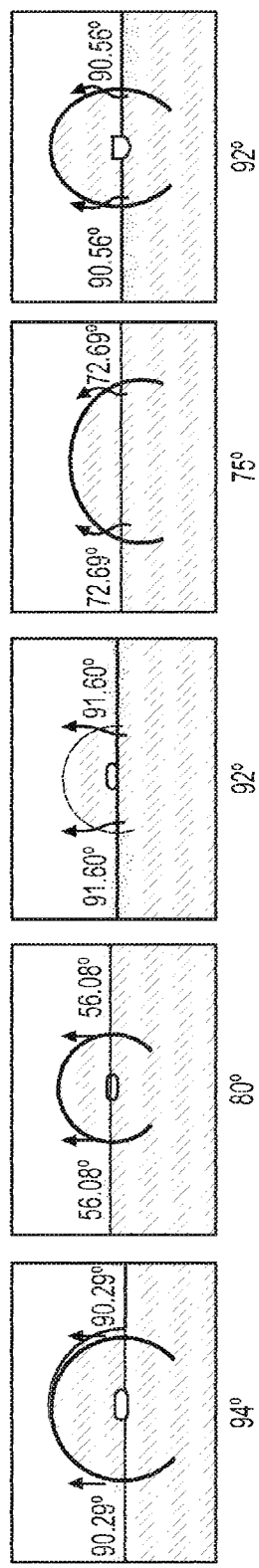
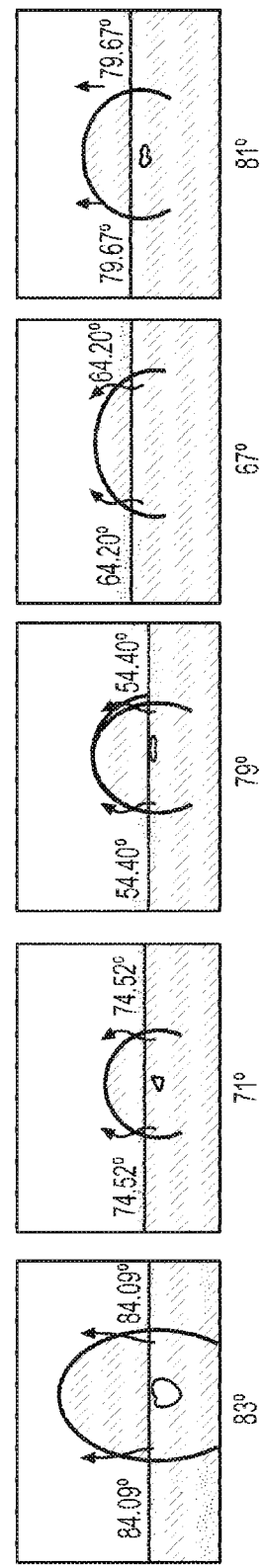

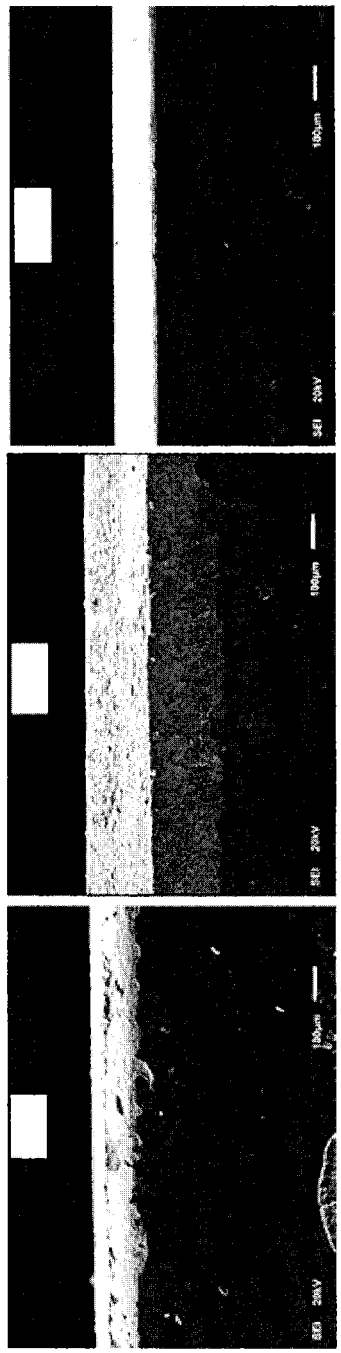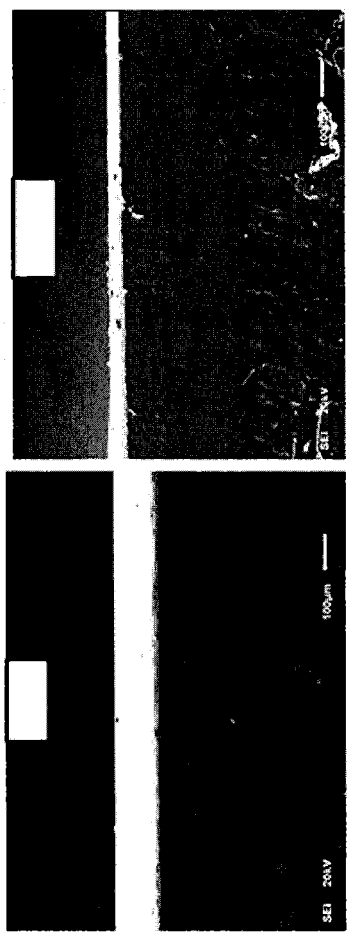
FIG. 14A  FIG. 14B  FIG. 14C  FIG. 14D  FIG. 14E

EPOXY COMPOSITE RESINS AND SOL-GEL COMPOSITIONS THEREOF

CROSS REFERENCE TO RELATED APPLICATION

This application claims the benefit of U.S. Provisional Application No. 62/153,119, filed Apr. 27, 2015.

BACKGROUND OF THE INVENTION

Technical Field

The present invention relates to synthetic resins. More specifically, the present invention relates to epoxy-based composite resins that contain aminosilane derivatives and a urethane compound. The resins are suitable for applications such as anticorrosion protective coatings of mild steel.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The total cost and environmental consequences of the corrosion problems of metal surfaces have become a major challenge to many industries, especially for the gas and oil industry [H. Potgieter, P. A. Olubambi, L. Cornish, C. N. Machio, E. S. M. Sherif, Influence of nickel additions on the corrosion behaviour of low nitrogen 22% Cr series duplex stainless steels, *Corrosion Science*, 2008, 50, 2572-2579, incorporated herein by reference in its entirety]. Mild steel is used in large tonnages in marine applications, nuclear power and fossil fuel power plants, transportation, chemical processing, petroleum production and refining, pipelines, mining, construction and metal-processing equipment. Mild steels are vulnerable to very high corrosion rates in aggressive solutions and atmospheres due to their limited alloying content, usually less than 2% by weight [Min Qian, Andrew Mcintosh Soutar, Xiu Hui Tan, Xian Ting Zeng and Sudesh L. Wijesinghe, Two-part epoxy-siloxane hybrid corrosion protection coatings for carbon steel, *Thin Solid Films*, 2009, 517, 5237-5242, incorporated herein by reference in its entirety]. Protective coatings are typically employed to protect the steel surface from corrosion. Chromate-based corrosion inhibitors have been used extensively in corrosion resistant coatings. However, the hexavalent chromium Cr(VI) ingredient is highly carcinogenic and is on the way of being abandoned. Thus, there exists an urgent need for environmental friendly alternatives with high resistance and equivalent or enhanced corrosion protection [C. Chang, C. Wang, C. Wu, S. Liu, F. Mai, Using ToF-SIMS and EIS to evaluate green pretreatment reagent: Corrosion protection of aluminum alloy by silica/zirconium/cerium hybrid coating, *J. Appl. Surf. Sci.*, 2008, 255, 1531-1533, incorporated herein by reference in its entirety].

In the last two decades, the potential of hybrid organic-inorganic sol-gel materials for the replacement of chrome conversion treatments has generated considerable research and public interest [R. Suleiman, M. Mizanurrahman, N. Alfaifi, B. El Ali, R. Akid, Corrosion resistance properties of hybrid organic-inorganic epoxy-amino functionalized polysiloxane based coatings on mild steel in 3.5% NaCl solution, *Corrosion Engineering, Science and Technology*, 2013, 48, 525-529; R. Suleiman, M. Khaled, H. Wang, J. Gittens, T. Smith, R. Akid, B. El Ali, A. Khalil. A comparison of selected inhibitor doped sol-gel coating systems for the protection of mild steel. *Corrosion Engineering, Science and Technology*, 2014, 49, 189-196; R. Suleiman, Corrosion Protective Performance of Epoxy-Amino Branched Polydimethylsiloxane Hybrid Coatings on Mild Steel, *Anti-Corrosion Methods and Materials*, 2014, 61, 423-430; M. Fedel, M. Olivier, M. Poelman, F. Deflorian, S. Rossi, M.-E. Druart, Corrosion protection properties of silane pre-treated powder coated galvanized steel, *Progress in Organic Coatings*, 2009, 66, 118-128, each incorporated herein by reference in its entirety]. These materials combine the balanced properties of organic polymers (e.g., flexibility, ductility, dielectric) and silica (e.g., high thermal stability, strength, hardness, UV-VIS absorbance), thus having interesting mechanical and barrier properties on metal surfaces [S. K. Poznyak, M. L. Zheludkevich, D. Raps, F. Gammel, K. A. Yasakau, M. G. S. Ferreira, Preparation and corrosion protective properties of nanostructured titania-containing hybrid sol-gel coatings on AA2024, *Progress in Organic Coatings*, 2008, 62, 226-235; V. Moutarlier, B. Neveu, M. P. Gigandet, Evolution of corrosion protection for sol-gel coatings doped with inorganic inhibitors, *Surface and Coatings Technology*, 2008, 202, 2052-2058; S. V. Lamaka, M. F. Montemor, A. F. Galio, M. L. Zheludkevich, C. Trindade, L. F. Dick, M. G. S. Ferreira, Novel hybrid sol-gel coatings for corrosion protection of AZ31B magnesium alloy, *Electrochim. Acta*, 2008, 53, 4773-4783, each incorporated herein by reference in its entirety]. Sol-gel derived organic-inorganic hybrid coatings are mainly produced through the hydrolysis and condensation reaction of organofunctional alkoxysilane precursors. [M. W. Daniels and L. F. Francis, Silane adsorption behavior, microstructure, and properties of glycidoxypropyltrimethoxysilane-modified colloidal silica coatings, *J. Colloid. Inter. Sci.*, 1998, 205, 191-200; M. W. Daniels and L. F. Francis, Effect of Curing Strategies on Porosity in Silane modified Silica Colloidal Coatings, *Mater. Res. Proc. Res. Soc.*, 1999, 576, 313-317, each incorporated herein by reference in its entirety]. They were prepared also by the blending of siloxanes with hydrocarbon-based polymers; more notably epoxy resins [S. H. Cho, S. R. White, P. V. Braun, Room-temperature polydimethylsiloxane-based self-healing polymers, *Chem. Mater.*, 2012, 24, 4209-4214; M. Y. Sho, H. Kwon, Comparison of surface modification with amino terminated polydimethylsiloxane and amino branched polydimethylsiloxane on the corrosion protection of epoxy coating, *Corrosion Science*, 2009, 51, 650-657, each incorporated herein by reference in its entirety]. The corrosion resistance of these coatings has been attributed to their physical barrier properties, which restrict the penetration of the electrolyte towards the metallic substrate [H. Wang, R. Akid, A room temperature cured sol-gel anticorrosion pretreatment for Al 2024-T3 alloys, *Corrosion Science*, 2007, 49, 4491-4503, incorporated herein by reference in its entirety]. The chemical structure and organic functionality of silanes can be varied in order to achieve the maximum effect in terms of hydrolytic stability of the interface, desired hydrophobicity or adhesion properties.

Although siliconized epoxy hybrid materials have been reported in the literature, reports on similar materials having urethane moieties are very rare. [D. K. Chattopadhyay, D. C. Webster, Hybrid coatings from novel silane-modified glycidyl carbamate resins and amine crosslinkers, *Progress in Organic Coatings*, 2009, 66, 73-85; A. J. Vreugdenhil, V. J. Gelling, M. E. Woods, J. R. Schmelz, B. P. Enderson, The role of crosslinkers in epoxy-amine crosslinked silicon sol-gel barrier protection coatings, *Thin Solid Films*, 2008, 517, 538-543; P. Gupta, M. Bajpai, Development of Siliconized Epoxy Resins and Their Application as Anticorrosive Coatings, *Advances in Chemical Engineering and Science,* 2011, 1, 133-139; P. Bajpai and M. Bajpai, Development of a high performance hybrid epoxy silicone resin for coatings, *Pigment & Resin Technology,* 2010. 39, 96-100; S. K. Rath, J. G. Chavan, S. Sasane, Alips Srivastava, M. Patri, A. B. Samui, B. C. Chakraborty, S. N. Sawant, Coatings of PDMS-modified epoxy via urethane linkage: Segmental correlation length, phase morphology, thermomechanical and surface behavior, *Progress in Organic Coatings,* 2009, 65, 366-374; R. Suleiman, H. Dafalla, B. El Ali, Novel hybrid epoxy silicone materials as efficient anticorrosive coatings for mild steel, *RSC Advances,* 2015, 5, 39155-39167 each incorporated herein by reference in its entirety].

In view of the foregoing, and as part of the continuing efforts in developing new coating compositions, the present disclosure provides epoxy-based resins that have been functionalized to enhance their corrosion resistance.

BRIEF SUMMARY OF THE INVENTION

According to a first aspect, the present disclosure relates to a sol-gel composite resin that is advantageously in the form of a stable gel that can be stored for long periods of time ambient temperature without curing and does not require a hardener for curing. The sol-gel composite resin is obtained as a reaction product of a reaction mixture comprising, relative to the total volume of the reaction mixture: 3.0-15.0 vol. % of a liquid polyglycol epoxide, 10.0-30.0 vol. % of an aminosilane, 25.0-70.0 vol. % of one or more of a trialkoxysilane, a tetraalkoxysilane, or both, and 5.0-25.0 vol. % of an isocyanate.

In certain embodiments, the sol-gel composite resin comprises 10.0-65.0% by weight of siloxane groups relative to the total weight of the composite resin. These siloxane groups are formed by hydrolysis of the aminosilane and the one or more of the trialkoxysilane, the tetraalkoxysilane, or both into silanol groups and polycondensation of the silanol groups.

In certain embodiments, the sol-gel composite resin comprises 20.0-75.0% by weight of urethane moieties relative to the total weight of the composite resin. The urethane moieties are formed between the isocyanate and hydroxyl groups formed by coupling of the liquid polyglycol epoxide and the aminosilane.

In one embodiment, the liquid polyglycol epoxide is selected from the group consisting of poly(ethylene glycol) diglycidyl ether, poly(propylene glycol) diglycidyl ether and poly(butylene glycol) diglycidyl ether.

In one embodiment, the aminosilane is selected from the group consisting of (3-aminopropyl)-trimethoxysilane (APTMS), (3-aminopropyl)-triethoxysilane (APTES), (3-aminopropyl)-diethoxy-methylsilane (APDEMS), (3-aminopropyl)-dimethoxy-methylsilane (APDMMS), (3-aminopropyl)-diethoxy-ethylsilane (APDEES), (3-aminopropyl)-dimethoxy-ethylsilane (APDMES), aminopropyl terminated polydimethylsiloxane (APT-PDMS), aminopropyl terminated polydiethylsiloxane (APT-PDES) and aminopropylmethylsiloxane-dimethylsiloxane (APM-DMS).

In one embodiment, the trialkoxysilane and the tetraalkoxysilane are selected from the group consisting of methyltrimethoxysilane (MTMS), methyltriethoxysilane (MTES), ethyltrimethoxysilane (ETMS), ethyltriethoxysilane (ETES), (3-glycidoxypropyl)-trimethoxysilane (GPTMS), (3-glycidoxypropyl)-triethoxysilane (GPTES), tetramethoxysilane (TMOS) and tetraethoxysilane (TEOS).

In one embodiment, the isocyanate is selected from the group consisting of methyl isocyanate (MIC), toluene diisocyanate (TDI), methylene diphenyl diisocyanate (MDI), hexamethylene diisocyanate (HDI) and isophorone diisocyanate (IPDI).

In some embodiments, the reaction mixture further comprises 1.0-10.0 vol. % of a strong, inorganic acid solution, relative to the total volume of the reaction mixture.

In some embodiments, the reaction mixture further comprises 30.0-40.0 vol. % of a non-aqueous solvent, relative to the total volume of the reaction mixture.

In one embodiment, the reaction mixture comprises, relative to the total volume of the reaction mixture: 6.0-10.0 vol. % of poly(propylene glycol) diglycidyl ether; 15.0-25.0 vol. % of an aminosilane selected from the group consisting of 3-aminopropyl)-trimethoxysilane (APTMS), aminopropyl terminated polydimethylsiloxane (APT-PDMS) and aminopropylmethylsiloxane-dimethylsiloxane (APM-DMS); 30.0-50.0 vol. % of tetraethoxysilane (TEOS) or methyltrimethoxysilane (MTMS); and 12.5-18.5 vol. % of isophorone diisocyanate.

In one embodiment, the reaction mixture comprises, relative to the total volume of the reaction mixture: 8.0-10.0 vol. % of poly(propylene glycol) diglycidyl ether; 17.5-22.5 vol. % of an aminosilane selected from the group consisting of 3-aminopropyl)-trimethoxysilane (APTMS), aminopropyl terminated polydimethylsiloxane (APT-PDMS) and aminopropylmethylsiloxane-dimethylsiloxane (APM-DMS); 17.5-22.5 vol. % of (3-glycidoxypropyl)-trimethoxysilane (GPTMS); 37.5-42.5 vol. % of methyltrimethoxysilane (MTMS); and 8.0-8.5 vol. % of isophorone diisocyanate.

The sol-gel composite resin possesses at least one of the following characteristics: having a corrosion resistance of $10^3$-$10^{10}$ $\Omega cm^2$; having a corrosion current of $10^{-5}$-$10^{-10}$ mA; and having a hardness of 0.1 GPa to 5.0 GPa when coated and cured on a mild steel substrate.

According to a second aspect, the present disclosure relates to a process for preparing the sol-gel composite resin. In the process, the aminosilane, the one or more of the trialkoxysilane, the tetraalkoxysilane, or both, and the liquid polyglycol epoxide are mixed to form an epoxy-silane mixture; and the isocyanate is mixed with the epoxy-silane mixture.

In some embodiments, the process further comprises mixing the aminosilane, the one or more of the trialkoxysilane, the tetraalkoxysilane, or both to form a silane mixture; and mixing the liquid polyglycol epoxide with the silane mixture to form an epoxy-silane mixture.

In some embodiments, the process further comprises mixing an acid solution with the silane mixture or the epoxy-silane mixture.

In some embodiments, the process further comprises mixing a non-aqueous solvent with the silane mixture or the epoxy-silane mixture.

According to a third aspect, the present disclosure relates to a coating composition comprising the sol-gel composite resin, optionally one or more of dye compounds and/or color pigments, and optionally one or more active corrosion inhibitors.

According to a fourth aspect, the present disclosure relates to a mild steel substrate comprising the sol-gel composite resin coated and cured, on at least one surface of the substrate to form a thin film coating.

According to a fifth aspect, the present disclosure relates to a method for protecting a mild steel substrate against corrosion. In the method, the mild substrate is coated, on at least one surface of the substrate, with the sol-gel composite resin and the sol-gel composite is cured on the surface to form a thin film coating.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 11A shows a section of the panel of FIG. 6A before immersion in 3.5 wt % NaCl for 10 days.

FIG. 11B shows a section of the panel of FIG. 6B before immersion in 3.5 wt % NaCl for 10 days.

FIG. 11C shows a section of the panel of FIG. 6C before immersion in 3.5 wt % NaCl for 10 days.

FIG. 11D shows a section of the panel of FIG. 6D after immersion in 3.5 wt % NaCl for 10 days.

FIG. 11E shows a section of the panel of FIG. 6E after immersion in 3.5 wt % NaCl for 10 days.

FIG. 11F shows a section of the panel of FIG. 6A after immersion in 3.5 wt % NaCl for 10 days.

FIG. 11G shows a section of the panel of FIG. 6B after immersion in 3.5 wt % NaCl for 10 days.

FIG. 11H shows a section of the panel of FIG. 6C after immersion in 3.5 wt % NaCl for 10 days.

FIG. 11I shows a section of the panel of FIG. 6D after immersion in 3.5 wt % NaCl for 10 days.

FIG. 11J shows a section of the panel of FIG. 6E after immersion in 3.5 wt % NaCl for 10 days.

FIG. 12A shows the contact angle (94°) for the hybrid coating C0 before immersion in 3.5 wt % NaCl for 10 days (Non-immersed).

FIG. 12B shows the contact angle (80°) for the hybrid coating C1 before immersion in 3.5 wt % NaCl for 10 days (Non-immersed).

FIG. 12C shows the contact angle (92°) for the hybrid coating C2 before immersion in 3.5 wt % NaCl for 10 days (Non-immersed).

FIG. 12D shows the contact angle (75°) for the hybrid coating C3 before immersion in 3.5 wt % NaCl for 10 days (Non-immersed).

FIG. 12E shows the contact angle (92°) for the hybrid coating C4 before immersion in 3.5 wt % NaCl for 10 days (Non-immersed).

FIG. 12F shows the contact angle (83°) for the hybrid coating C0 after immersion in 3.5 wt % NaCl for 10 days (Immersed).

FIG. 12G shows the contact angle (71°) for the hybrid coating C1 after immersion in 3.5 wt % NaCl for 10 days (Immersed).

FIG. 12H shows the contact angle (79°) for the hybrid coating C2 after immersion in 3.5 wt % NaCl for 10 days (Immersed).

FIG. 12I shows the contact angle (67°) for the hybrid coating C3 after immersion in 3.5 wt % NaCl for 10 days (Immersed).

FIG. 12J shows the contact angle (81°) for the hybrid coating C4 after immersion in 3.5 wt % NaCl for 10 days (Immersed).

FIG. 14A is an SEM micrograph of a cross-section of the hybrid coating C0.

FIG. 14B is an SEM micrograph of a cross-section of the hybrid coating C1.

FIG. 14C is an SEM micrograph of a cross-section of the hybrid coating C2.

FIG. 14D is an SEM micrograph of a cross-section of the hybrid coating C3.

FIG. 14E is an SEM micrograph of a cross-section of the hybrid coating C4.

DETAILED DESCRIPTION OF THE EMBODIMENTS

Figure 1:
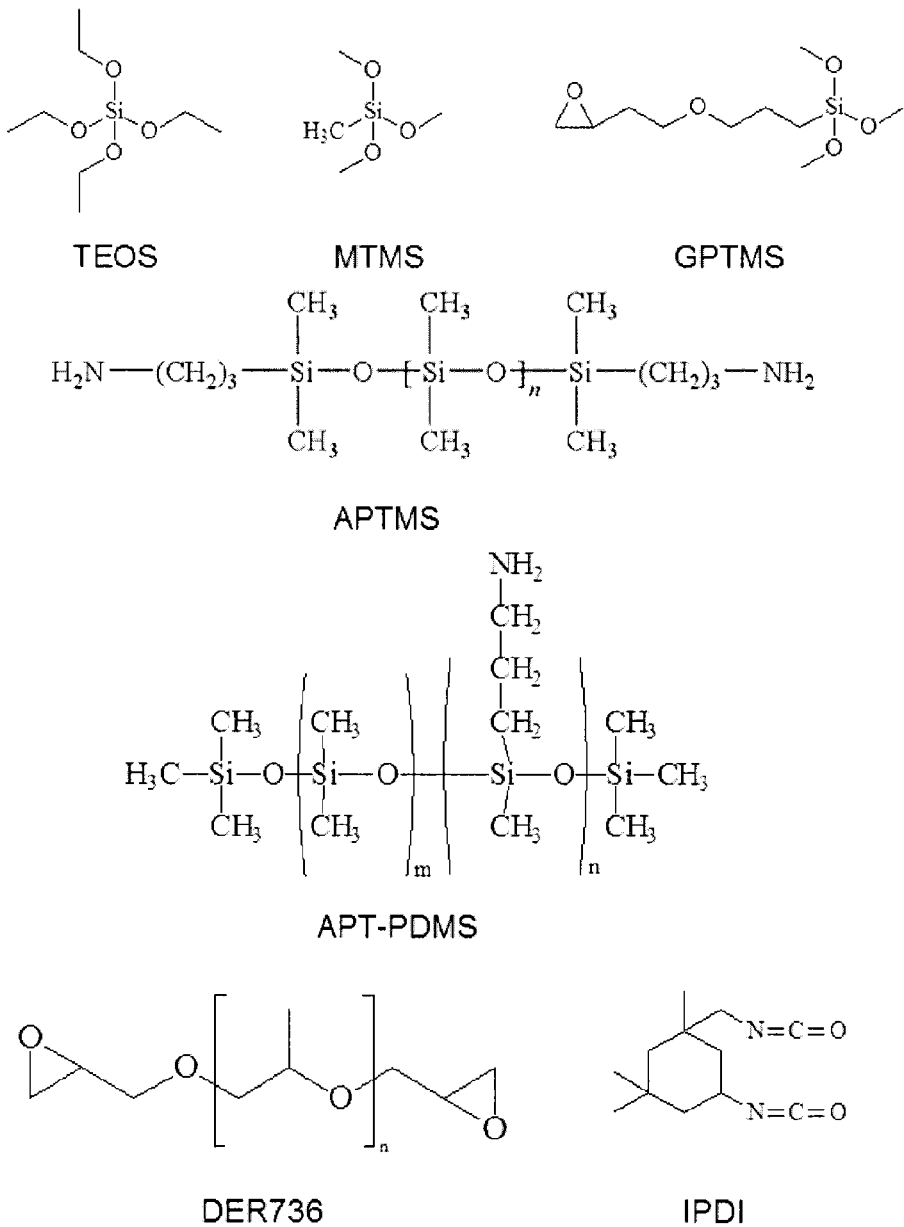
FIG. 1 shows the chemical structures of all chemicals and compounds involved in the synthesis of the epoxy composite resins described herein.

Referring now to the drawings, wherein like reference numerals designate identical or corresponding parts throughout the several views.

The present disclosure provides sol-gel processed composite resins obtained as a reaction product of a reaction mixture comprising a liquid epoxy resin, an aminosilane, one or more of tri-, tetra-alkoxysilanes or mixtures thereof, and an isocyanate that imparts the urethane functionality to the composite resin.

For purposes of the present disclosure, a "sol-gel process" is a chemical synthesis technique for materials, including resins, where an oxide network is formed through at least polycondensation reactions of a molecular precursor in a liquid. In the present case, the molecular precursors are the silane derivatives (aminosilanes and alkoxysilanes) and the liquid is the liquid epoxy resin. The finished product of a sol-gel synthesis process can be referred as a "sol-gel material", a "sol-gel processed material", a "sol-gel product" or a "sol-gel processed product".

In some embodiments, the liquid epoxy resin in the composite resin is a polyglycol epoxide, such as but not limited to poly(ethylene glycol) diglycidyl ether, poly(propylene glycol) diglycidyl ether and poly(butylene glycol) diglycidyl ether. In one embodiment, the liquid epoxy resin in the epoxy composite resin is poly(propylene glycol) diglycidyl ether.

In other embodiments, the liquid epoxy resin is bisphenol-based, and the bisphenol, which is optionally modified, is selected from the group consisting of bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC and bisphenol Z.

In certain embodiments, the liquid epoxy resin of the composite resin is a commercial resin selected from the group consisting of DER (Dow Epoxy Resin) 317, DER 324, DER 325, DER 330, DER 331, DER 332, DER 337, DER 362, DER 364, DER 383, DER 732 and DER 736. Preferably, the liquid epoxy resin is DER 732 or DER 736. In one embodiment, the liquid epoxy resin is DER 736.

The amount of the liquid epoxy resin contained in a sol-gel reaction mixture for the composite resin ranges 3.0-15.0% by volume relative to the total volume of the reaction mixture, preferably 5.0-15.0%, more preferably 6.0-12.0%, even more preferably 6.0-10.0%, most preferably 8.0-10.0%. In one embodiment, an epoxy composite resin of the present disclosure contains 6.3-9.1% by volume of the epoxy resin, relative to the total volume of the reaction mixture.

The aminosilane, which is an organofunctional alkoxysilane having a primary or secondary amine functional group, serves as a coupling or cross-linking agent for the liquid epoxy resin in the composite resin. The aminosilane coupling agents have the ability to form durable bonds between the epoxy groups of the resin and the amino groups of the aminosilane. In some embodiments, the aminosilane is represented by Formula 1:

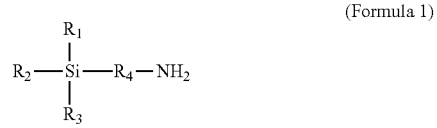

(Formula 1)

where $R_1$-$R_3$ are each independently an optionally substituted $C_1$-$C_6$ alkyl group or an optionally substituted $C_1$-$C_6$ alkoxy group, preferably an optionally substituted $C_1$-$C_4$ alkyl group or an optionally substituted $C_1$-$C_4$ alkoxy group, more preferably an optionally substituted $C_1$-$C_3$ alkyl group or an optionally substituted $C_1$-$C_3$ alkoxy group, even more preferably an optionally substituted $C_1$-$C_2$ alkyl group or an optionally substituted $C_1$-$C_2$ alkoxy group; and $R_4$ is an optionally substituted $C_1$-$C_6$ alkyl group, preferably an optionally substituted $C_1$-$C_4$ alkyl group, more preferably an optionally substituted $C_1$-$C_3$ alkyl group, most preferably an optionally substituted propyl group.

In one embodiment, the aminosilane is selected from (3-aminopropyl)-trimethoxysilane (APTMS), (3-aminopropyl)-triethoxysilane (APTES), (3-aminopropyl)-diethoxymethylsilane (APDEMS), (3-aminopropyl)-dimethoxymethylsilane (APDMMS), (3-aminopropyl)-diethoxyethylsilane (APDEES), (3-aminopropyl)-dimethoxyethylsilane (APDMES), aminopropyl terminated polydimethylsiloxane (APT-PDMS), aminopropyl terminated polydiethylsiloxane (APT-PDES) and aminopropylmethylsiloxane-dimethylsiloxane (APM-DMS). Preferably, the aminosilane is one of 3-aminopropyl)-trimethoxysilane (APTMS), aminopropyl terminated polydimethylsiloxane (APT-PDMS) and aminopropylmethylsiloxane-dimethylsiloxane (APM-DMS).

The amount of an aminosilane contained in the reaction mixture for the composite resin ranges 10.0-30.0% by volume relative to the total volume of the reaction mixture, preferably 15.0-30.0%, more preferably 15.0-27.5%, even more preferably 15.0-25.0%, most preferably 17.5-22.5%. In one embodiment, the reaction mixture contains 15.9-22.7% by volume of the aminosilane, relative to the total volume of the reaction mixture.

In alternative embodiments, instead of or in addition to an aminosilane, the coupling or cross-linking agent of the composite resin is an alkoxysilane whose organic function is an epoxide (i.e. glycidoxysilane) or a thiol (i.e. mercaptosilane). In certain embodiments, the glycidoxysilane and the mercaptosilane are represented by Formulas 2 and 3, respectively:

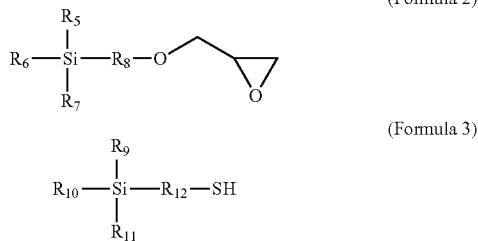

(Formula 2)

(Formula 3)

where $R_5$-$R_8$ and $R_9$-$R_{11}$ are each independently an optionally substituted $C_1$-$C_6$ alkyl group or an optionally substituted $C_1$-$C_6$ alkoxy group, preferably an optionally substituted $C_1$-$C_4$ alkyl group or an optionally substituted $C_1$-$C_4$ alkoxy group, more preferably an optionally substituted $C_1$-$C_3$ alkyl group or an optionally substituted $C_1$-$C_3$ alkoxy group, even more preferably an optionally substituted $C_1$-$C_2$ alkyl group or an optionally substituted $C_1$-$C_2$ alkoxy group; $R_8$ and $R_{12}$ are each independently an optionally substituted $C_1$-$C_6$ alkyl group, preferably an optionally substituted $C_1$-$C_4$ alkyl group, more preferably an optionally substituted $C_1$-$C_3$ alkyl group, most preferably an optionally substituted propyl group.

In one embodiment, the glycidoxysilane or the mercaptosilane are selected from (3-glycidoxypropyl)-dimethylethyloxysilane (GPMES), (3-glycidoxypropyl)-dimethylmethoxysilane (GPMMS), (3-glycidoxypropyl)-diethylmethyoxysilane (GPEMS), (3-glycidoxypropyl)-diethylethyoxysilane (GPEES), (3-mercaptopropyl)-trimethoxysilane (MPTMS), (3-mercaptopropyl)-triethoxysilane (MPTES), (3-mercaptopropyl)-dimethoxymethylsilane (MPDMMS), 3-mercaptopropyl)-dimethoxyethylsilane (MPDMES), 3-mercaptopropyl)-diethoxymethylsilane (MPDEMS) and 3-mercaptopropyl)-diethoxyethylsilane (MPDEES).

One or more of trialkoxysilanes, tetraalkoxysilanes or a combination thereof are included as adhesion promoters in the formulation of the composite resin. Adhesion promoters facilitate or promote adhesion or sticking of the composite resin to surfaces. The tri- or tetra-alkoxysilane is represented by Formula 4:

(Formula 4)

where at least three of $R_{13}$-$R_{16}$ are each independently an optionally substituted $C_1$-$C_6$ alkoxy group, preferably an optionally substituted $C_1$-$C_4$ alkoxy group, more preferably an optionally substituted $C_1$-$C_3$ alkoxy group, even more preferably an optionally substituted $C_1$-$C_2$ alkoxy group; and when three of $R_{13}$-$R_{16}$ are the alkoxy groups as defined, the remaining R group, which may be $R_{13}$, $R_{14}$, $R_{15}$ or $R_{16}$, is an optionally substituted $C_1$-$C_6$ alkyl group, preferably an optionally substituted $C_1$-$C_4$ alkyl group, more preferably an optionally substituted $C_1$-$C_3$ alkyl group, most preferably an optionally substituted $C_1$-$C_2$ group.

In one embodiment, the trialkoxysilanes and tetraalkoxysilanes are selected from methyltrimethoxysilane (MTMS), methyltriethoxysilane (MTES), ethyltrimethoxysilane (ETMS), ethyltriethoxysilane (ETES), (3-glycidoxypropyl)-trimethoxysilane (GPTMS), (3-glycidoxypropyl)-triethoxysilane (GPTES), tetramethoxysilane (TMOS) and tetraethoxysilane (TEOS). Preferably, the trialkoxysilanes and tetraalkoxysilanes are selected from methyltrimethoxysilane (MTMS), (3-glycidoxypropyl)-trimethoxysilane (GPTMS) and tetraethoxysilane (TEOS). In one embodiment, an epoxy-silica hybrid composition contains only tetraethoxysilane (TEOS) or methyltrimethoxysilane (MTMS) as the adhesion promoter. In another embodiment, an epoxy composite resin contains a mixture of (3-glycidoxypropyl)-trimethoxysilane (GPTMS) and tetraethoxysilane (TEOS) at a volume ratio of 1:1-3 (GPTMS:TEOS).

The total amount of the tri- and/or tetraalkoxysilane adhesion promoter(s) contained in the reaction mixture for the composite resin ranges 25.0-70.0% by volume relative to the total volume of the reaction mixture, preferably 30.0-65.0%, more preferably 30.0-60.0%. In one embodiment, the reaction mixture for a composite resin provided herein contains 31.7-60.0% by volume of the adhesion promoter(s), relative to the total volume of the reaction mixture. In one embodiment, the reaction mixture for the composite resin contains 30.0-50.0% by volume of a single adhesion promoter selected from tetraethoxysilane (TEOS) and methyltrimethoxysilane (MTMS), relative to the total volume of the composition, preferably 31.0-46.0%, more preferably 31.7-45.5%. In another embodiment, the reaction mixture for the composite resin contains 15.0-25.0% by volume of (3-glycidoxypropyl)-trimethoxysilane (GPTMS) and 35.0-45.0% by volume of methyltrimethoxysilane (MTMS), relative to the total volume of the reaction mixture, preferably 17.5-22.5% by volume of (3-glycidoxypropyl)-trimethoxysilane (GPTMS) and 37.5-42.5% by volume of methyltrimethoxysilane (MTMS). In one embodiment, the reaction mixture for the composite contains 20.0% by volume of (3-glycidoxypropyl)-trimethoxysilane (GPTMS) and 40.0% by volume of methyltrimethoxysilane (MTMS), The isocyanate incorporated in the epoxy composite resin to impart the urethane functionality can be aliphatic or aromatic, and is represented by Formula 5 or Formula 6:

 (Formula 5)

 (Formula 6)

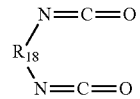

where $R_{17}$ is an optionally substituted $C_1$-$C_{12}$ aliphatic or aromatic group and $R_{18}$ is an optionally $C_6$-$C_{12}$ aromatic group.

In some embodiments, the isocyanate is selected from methyl isocyanate (MIC), toluene diisocyanate (TDI), methylene diphenyl diisocyanate (MDI), hexamethylene diisocyanate (HDI) and isophorone diisocyanate (IPDI). In certain embodiments, the isocyanate is preferably a diisocyanate. In one embodiment, isophorone diisocyanate (IPDI) is used a urethane precursor in the hybrid composition.

The amount of isocyanate in the sol-gel reaction mixture for the composite resin is 5.0-25.0% by volume relative to the total volume of the reaction mixture, preferably 5.0-

20.0%, more preferably 7.5-20.0%. In one embodiment, the reaction mixture contains 8.0-18.5% by of the isocyanate, relative to the total volume of the reaction mixture, for example, 8.0-8.5%, 12.0-13.0%, 12.5-18.5% and 18.0-18.5%.

Specific embodiments of the sol-gel reaction mixture for the composite resin include but are not limited to the following:

(i) 10.0 vol. % of poly(propylene glycol) diglycidyl ether (epoxy resin)+25.0 vol. % of aminopropyl terminated polydimethylsiloxane (APT-PDMS, aminosilane cross-linker)+50.0 vol. % of tetraethoxysilane (TEOS, tetraalkoxysilane adhesion promoter)+10.0 vol. % of isophorone diisocyanate (IPDI, diisocyanate urethane precursor)

(ii) 8.0 vol. % of poly(propylene glycol) diglycidyl ether (epoxy resin)+20.0 vol. % of aminopropylmethylsiloxane-dimethylsiloxane (APM-DMS, aminosilane cross-linker)+20.0 vol. % of (3-glycidoxypropyl)-trimethoxysilane (GPTMS, trialkoxysilane adhesion promoter)+40.0 vol. % of methyltrimethoxysilane (MTMS, trialkoxysilane adhesion promoter)+8.0 vol. % of isophorone diisocyanate (IPDI, diisocyanate urethane precursor)

(iii) 6.3 vol. % of poly(propylene glycol) diglycidyl ether (epoxy resin)+15.9 vol. % of aminopropyl terminated polydimethylsiloxane (APT-PDMS, aminosilane cross-linker)+31.7 vol. % of tetraethoxysilane (TEOS, tetraalkoxysilane adhesion promoter)+12.7 vol. % of isophorone diisocyanate (IPDI, diisocyanate urethane precursor)

(iv) 9.1 vol. % of poly(propylene glycol) diglycidyl ether (epoxy resin)+22.7 vol. % of (3-aminopropyl)-trimethoxysilane (APTMS, aminosilane cross-linker)+45.5 vol. % of methyltrimethoxysilane (MTMS, trialkoxysilane adhesion promoter)+18.2 vol. % of isophorone diisocyanate (IPDI, diisocyanate urethane precursor)

(v) 6.3 vol. % of poly(propylene glycol) diglycidyl ether (epoxy resin)+15.6 vol. % of aminopropyl terminated polydimethylsiloxane (APT-PDMS, aminosilane cross-linker)+31.3 vol. % of methyltrimethoxysilane (MTMS, trialkoxysilane adhesion promoter)+12.5 vol. % of isophorone diisocyanate (IPDI, diisocyanate urethane precursor)

In one embodiment, the composite resin is represented by Formula 7:

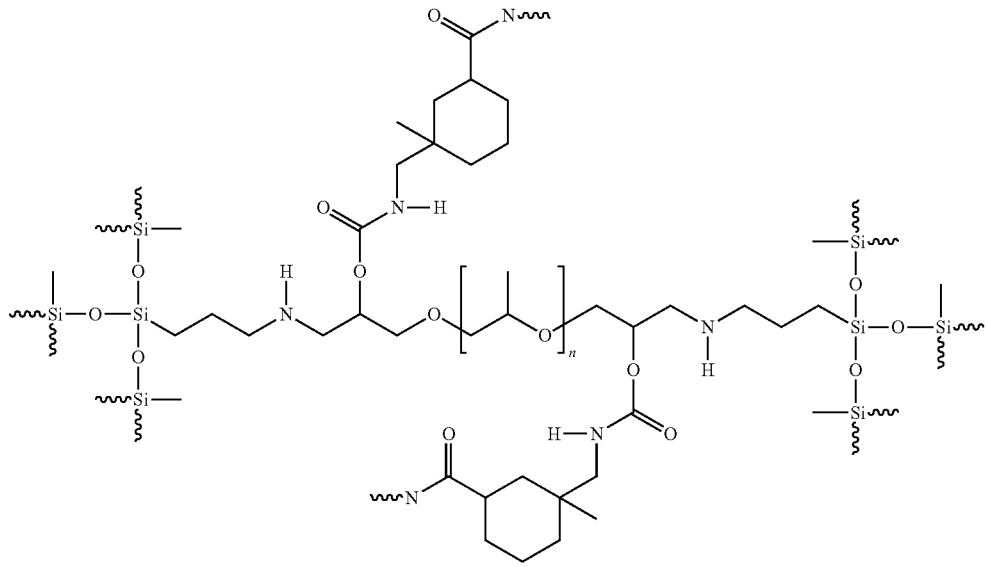

(Formula 7)

The composite resin in accordance with the present disclosure is prepared by an in situ sol-gel process where the components of epoxy resin, aminosilane, tri- and/or tetra-alkoxysilane(s) and isocyanate are mixed together sequentially. All steps of the sol-gel mixing process are preferably carried out at room temperature. The sol-gel process may be solvent-free or include an alcohol as a non-aqueous solvent. The alcohol is selected from methanol, ethanol, n-propanol, isopropyl alcohol (IPA), n-butanol and isobutanol. In at least one embodiment, isopropyl alcohol is used as a solvent in the sol-gel preparation process.

In one embodiment of the sol-gel process, the silanes (aminosilane and alkoxysilane) are mixed to form a silane mixture and a small amount of a dilute, strong acid solution is mixed with the silane mixture to promote hydrolysis of the silanes to form silanol groups. The acid is a strong inorganic acid such as but not limited to hydrochloric acid, nitric acid or sulfuric acid having a concentration of 0.01 N to 0.20 N, preferably 0.02 N to 0.15 N, more preferably 0.05 N to 0.10 N, dissolved in water or a non-aqueous solvent. In one embodiment, 0.05 N nitric acid in isopropyl alcohol is used. The amount of the acid added is 5-10% by volume relative to the total volume of the silane mixture, or 1.0-10.0% by volume relative to the total volume of the reaction mixture, preferably 1.5-5.0%, more preferably 1.5-4.5%. An alcohol, if used, is also mixed with the silane mixture and the amount of the alcohol added is 65-100% by volume relative to the total volume of the silane mixture, or 30.0-40.0% by volume relative to the total volume of the reaction mixture, preferably 30.0-35.0%, more preferably 30.0-32.0%. The epoxy resin is then added to the silane mixture and mixed for at least 4 hours, preferably overnight. Finally, the isocyanate is added to the reaction mixture and mixed again. In alternative embodiments, the order of mixing of the ingredients can be varied. In one particular alternative embodiment, the silanes and the epoxy resin are mixed simultaneously.

The formation mechanism of the epoxy-based sol-gel composite resin is as follows: First, a coupling reaction takes place between the epoxide groups of the resin and the amino groups of the aminosilane, resulting in formation of hydroxyl groups, specifically silanol (Si—OH) and alcohol (R—OH) groups. The alkoxysilanes are then hydrolyzed and the silanol groups from the hydrolyzed alkoxysilanes and from the coupling reaction between the epoxy resin and aminosilane undergo polycondensation to form an inorganic polymeric network of the organic-inorganic hybrid intermediate having siloxane moieties and unreacted alcohol hydroxyl groups. Finally, the unreacted alcohol hydroxyl groups from the intermediate react with the isocyanate to form urethane moieties. The composite resin produced therefore is a polymeric network having amino, siloxane (Si—O—Si) and urethane (NHR'COOR") moieties. Siloxane groups constitute 10.0-65.0% by weight of the composite resin relative to the total weight of the resin, preferably 15.0-60.0%, more preferably 20.0-50.0%, 25.0-50.0%, 30.0-50.0%, 40.0-50.0%, 45.0-50.0%, 20.0-55.0%, 25.0-55.0%, 30.0-55.0%, 40.0-55.0%, 45.0-55.0%, 50.0-55.0%, 20.0-60.0%, 25.0-60.0%, 30.0-60.0%, 40.0-60.0%. 45.0-60.0%, 50.0-60.0%, 55.0-60.0%. Urethane moieties constitute 20.0-75.0% by weight of the composite resin relative to the total weight of the resin, more preferably 25.0-75.0%, more preferably 30.0-75.0%, 40.0-75.0%, 45.0-75.0%, 50.0-75.0%, 60.0-75.0%, 70.0-75.0%, 30.0-60.0%, 40.0-60.0%, 45.0-60.0%, 50.0-60.0%, 55.0-60.0%, 30.0-65.0%, 40.0-65.0%, 45.0-65.0%, 50.0-65.0%, 55.0-65.0%, 60.0-65.0%.

The composite resin of the present disclosure is cured by coating a layer of the resin on a substrate to form a thin film coating, leaving the layer of thin film coating to dry at room temperature for 1-3 h, then placing the coated substrate at 80-120° C., preferably 90-110° C. for 24-72 h, preferably 36-60 h. Without being coated on a substrate, the composite resin remains in gel form. In alternative embodiments, a hardening or curing agent may be added to the reaction mixture for the composite resin, but not required, at a curing agent/reaction mixture volume ratio of 1:5-20, preferably 1:10-20, more preferably 1:12-18. A suitable curing agent for the curing process described herein is in liquid form, and is either amine- or acid anhydride-based, with a non-limiting list of examples including diethylenetramine (DTA), triethylenetetramine (TTA), tetraethylenepentamine (TEPA), dipropenediamine (DPDA), diethylaminpropylamine (DEAPA), N-aminoethylpiperazine (N-AEP), menthane diamine (MDA), isophoronediamine (IPDA), m-xylenediamine (m-XDA), methyltetrahydrophthalic anhydride, methylendomethylene tetrahydrophthalic anhydride, methylbutenyl tetrahydrophthalic anhydride, dodecenyl succinic anhydride, hexahydrophthalic anhydride and hexahydro-4-methylphthalic anhydride.

The present disclosure is further directed to an anticorrosive protective coating composition of mild steel comprising the composite resin. When loaded onto at least one surface of a mild steel substrate, the coating composition including the composite resin is cured and forms a thin film coating on the surface. The thin film coating has a thickness of 25-250 mm, preferably 50-150 mm, more preferably 100-150 mm. The coating offers at least a tight, low-permeability passive barrier protection against oxygen, water and salts (ions).

As evaluated by electrochemical impedance spectroscopy (EIS), an epoxy composite resin of the present disclosure has a corrosion resistance, of $10^3$-$10^{10}$ $\Omega cm^2$, preferably $10^4$-$10^9$ $\Omega cm^2$, more preferably $10^5$-$10^8$ $\Omega cm^2$, even more preferably $10^6$-$10^8$ $\Omega cm^2$, most preferably $10^7$-$10^8$ $\Omega cm^2$. In some embodiments, the coated mild steel substrate is subjected to different characterization techniques after a prolonged period (e.g. up to 14 days) of being immersed in an aqueous medium or salt solution containing at least 1.0 wt. % of salts (e.g. NaCl, KCl, $MgCl_2$, etc.), preferably 1.0-10.0 wt. %, more preferably 3.0-5.0 wt. %.

As evaluated by direct current (DC) polarization scanning, an epoxy composite resin of the present disclosure has a corrosion current, $I_{corr}$, of $10^{-5}$-$10^{-10}$ mA, preferably $10^{-6}$-$10^{-9}$ mA, more preferably $10^{-7}$-$10^{-8}$ mA. A known corrosion current ($I_{corr}$) is used to calculate the corrosion rate of a substrate. The lower the corrosion current is, the lower the corrosion rate would be.

As evaluated by water contact angle measurements before and after immersion in an aqueous salt solution, a mild steel substrate coated with an epoxy composite resin of the present disclosure exhibits a drop in the contact angle by no more than 20%, preferably 10-20%, more preferably 10-15%, which indicates a lack of wettability. The wetting and wettability of an anticorrosive protective coating is an indication of a loss in hydrophobicity of the surface coating which would eventually lead to the onset of corrosion. Hence, the lack of wettability is an indication of excellent anticorrosiveness of the hybrid coating composition. The immersion period is 1-30 days, preferably 3-20 days, more preferably 5-10 days. In one embodiment, the water contact angle is measured at the start then measured again after coated sample is immersed in an aqueous salt solution for 10 days.

As evaluated by nanoindentation hardness tests, the composite resin, when coated on a mild steel substrate at a thickness of 40-150 mm, preferably 110-150 mm, more preferably 110-140 mm, has a measured hardness of 0.1 GPa to 5.0 GPa, preferably 1.0 GPa to 4.0 GPa, more preferably 1.5 GPa to 4.0 GPa, 2.0 GPa to 4.0 GPa, even more preferably 3.0 GPa to 4.0 GPa, most preferably 3.0 GPa to 3.5 GPa. The contact depth of the coating, at 50 mN and the above thickness, is determined to be 1-20 mm, preferably 2-15 mm, more preferably 3-12 mm, even more preferably 3-8 mm.

The uncured composite resin is in liquid form and has a viscosity range of 4.0-8.5 mPa·S, preferably 4.5-8.0 mPa·S, more preferably 5.0-7.5 mPa·S, 4.5-7.5 mPa·S, 4.5-7.0 mPa·S, 5.0-8.0 mPa·S, 5.5-8.0 mPa·S, 6.0-8.0 mPa·S, 6.0-7.5 mPa·S, 5.5-7.5 mPa·S, 6.0-7.5 Pa·S, 6.5-7.5 mPa·S, 6.5-8.0 mPa·S.

In certain embodiments, the coating composition comprising the composite resin further protects a coated mild steel substrate against aggressive media for up to approximately two weeks. Examples of these aggressive media include but are not limited to solutions of hydrochloric acid, sulfuric acid, nitric acid, sodium hydroxide, potassium hydroxide and ammonia at concentrations of up to 3 M, preferably 0.5-3.0 M, more preferably 1.0-2.0 M.

In certain embodiments, a mild steel coating composition of the present disclosure further includes one or more dye compounds or color pigments.

In certain embodiments, the mild steel coating composition further includes one or more active corrosion inhibitors. Such an inhibitor acts in a cathodic manner (cathodic inhibitor), an anodic manner (anodic inhibitor) or both (mixed inhibitor). Preferably, the corrosion inhibitor is a zinc-based inhibitor or pigment, such as but not limited to zinc phosphate and lithium zinc phosphate. In one embodiment, the mild steel coating includes 0.05-2.0% of zinc phosphate by weight relative to the weight of the coating, preferably 0.1-1.0%, more preferably 0.2-0.5%. The reactive compound disrupts the normal formation of anodes on the surface of the mild steel. In particular, zinc phosphate ($Zn_3(PO_4)_2$) which is only slightly soluble in water, hydrolyzes in water to produce zinc ions ($Zn^{2+}$) and phosphate ions ($PO4^{3-}$). The phosphate ions act as anodic inhibitors by phosphating the steel and rendering it passive. The zinc ions act as cathodic inhibitors.

EXAMPLES

The examples below further illustrate protocols for the preparation and characterization of epoxy composite resins, as well as mild steel samples coated with these composite resins. These examples have been included for illustrative purposes, and are not intended to limit the scope of the appended claims.

In the following examples, a series of siliconized epoxy hybrid coatings containing urethane functionality were prepared. These epoxy-siliconized coatings comprise a blend of the DER736 epoxy resin, one or more trialkoxysilane adhesion promoters, an aminosilane crosslinker (APT-PDMS, APM-DMS or APTMS), and isophorone diisocyanate (IPDI). The examples below collectively accentuate the effect of changing the type of aminosilane on the properties of the prepared hybrid coatings. Three different aminosilanes were examined for their reaction parameters with the epoxy in order to avoid fast gelation and to obtain the desired properties of the hybrid coatings, including but not limited to good anticorrosion, heat resistance, adhesion and hardness.

The prepared organic-inorganic hybrid coatings were loaded and cured on mild steel panels, and subjected to structure elucidation, heat resistance, water contact angle, nanoindentation hardness, pull-off adhesion and electrochemical corrosion studies. The surfaces of all of the prepared coatings were having a slight hydrophobic character. The results revealed that the coatings prepared from the trialkoxysilanes APTMS and MTMS (C3) demonstrate the best mechanical, anticorrosion and adhesion properties on mild steel substrates as compared to all other coatings in a 3.5 wt % NaCl medium. Electrochemical impedance spectroscopy (EIS) results indicated a corrosion resistance value for this coating in the range of $10^6$ $\Omega cm^2$ after 10 days of continuous immersion in the saline medium. The SEM observations suggest that coatings produced from the other aminosilanes, APT-PDMS and APM-DMS are inhomogeneous and have some defects which have ultimately affected their barrier protection properties.

All of the above properties for the newly-prepared coatings C1, C2 and C3 are promising alternative substituents for the conventional chromate conversion coatings for the protection of mild steel substrate against corrosion. These materials will find applications in industries such as but not limited to metal processing, petrochemical and coating. Additionally, these materials can be used as matrices for the encapsulation of various additives like clays, corrosion inhibitors and bacteria which can led to materials with interesting, mechanical, barrier and antibacterial properties.

Example 1

Materials

Tetraethoxysilane (TEOS), methyltrimethoxysilane (MTMS), 3-glycidoxypropyltrimethoxysilane (GPTMS), (3-aminopropyl)trimethoxysilane (APTMS), diglycidyl ether of polyoxypropylene glycol (DER736), isophorone diisocyanate (IPDI) and isopropyl alcohol (IPA) were purchased from Sigma-Aldrich (US). Aminopropyl terminated polydimethylsiloxane (MW=5000) (APT-PDMS) was purchased from Flurochem (UK). 6-7%-Aminopropylmethylsiloxane-dimethylsiloxane copolymer (APM-DMS) was purchased from Gelest Inc. (US). All of the above chemicals were used as received and their chemical structures are shown in FIG. 1. Nitric acid ($HNO_3$) and sodium chloride (NaCl) was purchased from Loba Chemie, India. All reagents ($HNO_3$ and NaCl) used for the study were analar grade and deionized water was used for their preparation.

Example 2

Preparation of the Hybrid Coatings

The preparation of the hybrid coatings involves three steps:

i. the coupling reaction between the epoxy groups in DER736 and the amino groups in the aminosilanes;

ii. the reaction between the silanol groups in the product formed in the first step and the silanol groups from TEOS or MTMS. The silanol groups undergo hydrolysis and polycondensation reactions forming the inorganic polymeric network; and iii. the reaction of the isocyanate groups in IPDI with the remaining unreacted OH groups in the hybrid polymer forming the urethane moieties.

The order of the above steps and the amount of reactants was tuned carefully during the preparation of coatings in order to control the fast gelation and to deal with the poor mechanical properties of the final hybrid coatings. Table 1 summarizes the details on the preparation of the hybrid coatings (C0-C4) that showed promising stability, adhesion and mechanical properties.

TABLE 1

Composition of the prepared hybrid coatings.

| Sample Code* | Composition (volume in mL) | | | | | Order of mixing (At room temp.) |
|---|---|---|---|---|---|---|
| | Silane | Amino-silane | Epoxide | IPDI | IPA | |
| C0 | TEOS (10) | APT-PDMS (5) | DER736 (2) | 2 | — | Mix APT-PDMS with TEOS and DER736 for 3 hours. Add 1 mL of (0.05N $HNO_3$:IPA) and mix for overnight. Add IPDI and mix continuously. |

TABLE 1-continued

Composition of the prepared hybrid coatings.

| Sample Code* | Composition (volume in mL) | | | | | Order of mixing (At room temp.) |
|---|---|---|---|---|---|---|
| | Silane | Amino-silane | Epoxide | IPDI | IPA | |
| C1 | GPTMS (5) + MTMS (10) | APM-DMS (5) | DER736 (2) | 2 | — | Mix APM-DMS with GPTMS for 1 hour. Add MTMS and mix for 1 hour. Add 1 mL of (0.05N HNO$_3$:IPA) and mix for overnight. Add DER736 and mix for 3 days. Add IPDI and mix continuously. |
| C2 | TEOS (10) | APT-PDMS (5) | DER736 (2) | 4 | 10 | Mix APT-PDMS with TEOS, DER736 and IPA for overnight. Add 0.5 mL of (0.05N HNO$_3$:IPA) and mix for overnight. Add IPDI and mix continuously. |
| C3 | MTMS (10) | APTMS (5) | DER736 (2) | 4 | — | Mix APTMS with MTMS for 1 hour. Add DER736 and mix for 4 hours. Add 1 mL of (0.05N HNO$_3$:IPA) and mix for overnight. Add IPDI and mix continuously. |
| C4 | MTMS (10) | APTMS (5) | DER736 (2) | 4 | 10 | Mix APT-PDMS with MTMS, DER736 and IPA for overnight. Add 1.0 mL of (0.05N HNO$_3$:IPA) and mix for overnight. Add IPDI and mix continuously. |

Figure 2:
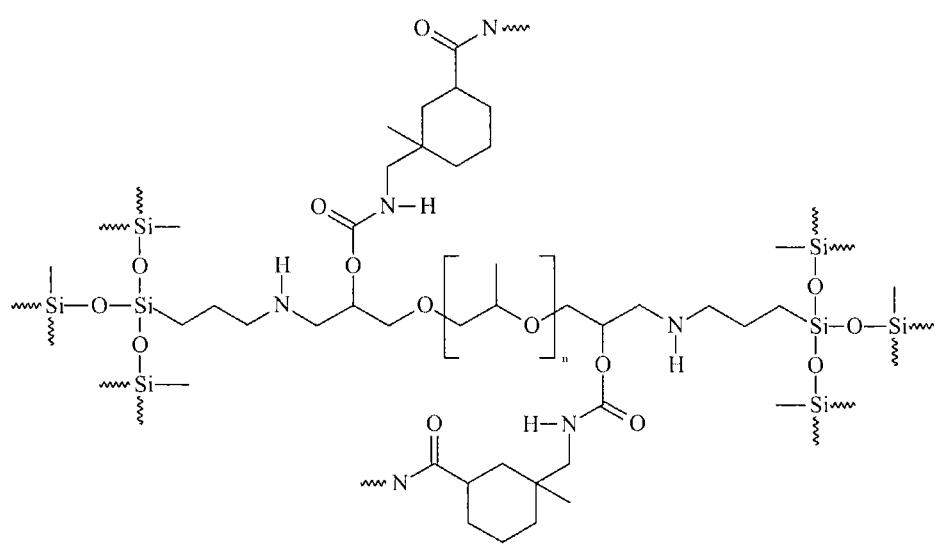
FIG. 2 shows a proposed chemical structure of the prepared resin C3.

No single chemical structure could be drawn for any of the prepared coatings since the presence of a variety of highly reactive OH, NH and NCO groups can lead to many competitive reactions. However, following the disappearance and the appearance of new functionalities using spectral techniques (FTIR and NMR) gave an insight on the occurrence of chemical reactions that led to the formation of the final hybrid coatings. As an example, a proposed chemical structure of the coating C3 is given in FIG. 2.

Example 3

Characterization of the Prepared Hybrid Coatings and Coated Mild Steel Samples $^1$H and $^{13}$C NMR spectra were recorded on 500 MHz Joel 1500 NMR machine. Chemical shifts (d) were reported in ppm relative to tetramethyl silane (TMS) using CDCl$_3$.

The Fourier transform infrared (FTIR) spectra for the hybrid coatings were collected in transmittance mode within 4000 to 400 cm$^{-1}$ range at 64 scans using a Nicolet 6700 Fourier Transform (FT) Spectrometer (Thermo Electron Corporation, UK) equipped with a DTGS KBr detector. The thermal behavior of the synthesized hybrid sol-gel coatings was studied by thermogravimetry (TG) (Perkin-Elmer TGA 7, US) analysis at a heating rate of 10° C. min$^{-1}$ through to 700° C. under nitrogen atmosphere.

The polarization studies were carried out using the GAMRY3000 corrosion measurement system. The potential of the electrode was varied from −0.25 V to 0.25 V. The electrochemical cell used for the current study consists of the prepared coated electrode as the working electrode, a graphite rod as the counter electrode, a SCE as the reference electrode, and 3.5% sodium chloride as the electrolyte. Surface Masks (GAMRY) of area of 1 cm$^2$ was used to mask the analyzed surface. EIS data were collected using a GAMRY3000 potentiostat with a frequency range between 100 kHz-10 mHz (100000-0.01 Hz). The number of points taken was 10/decade with AC voltage of 10 mV. The data obtained from the EIS measurements were plotted using an Excel spreadsheet.

The morphology of the coatings and cross sections before and after corrosion testing were studied using a JEOL JSM6610LV SEM. The contact angle measurement (CAM) instrument DSA30 (KRUSS, Deutsch, Germany) was used to evaluate the aqueous contact angle (θw) by pendant drop method, and the results presented in this study were the mean values of three trails collected at relatively closed locations on the individual films on steel.

The nanoindentation on the hybrid coatings were performed using a nanoindenter instrument (Model CSM Instruments NHT) fitted with a Rockwell diamond indenter having 100 µm tip radius at a final load of 50 mN. Hardness and elastic modulus were determined from the unloading part of the force-depth (F-d) curve. The evaluation of the adhesion strength of all hybrid coatings on mild steel panels was carried out using a Hydraulic Adhesion Tester from paint test equipment, UK.

Example 4

Fourier Transform Infrared (FTIR) Spectroscopy of the Prepared Hybrid Coatings

Figure 3:
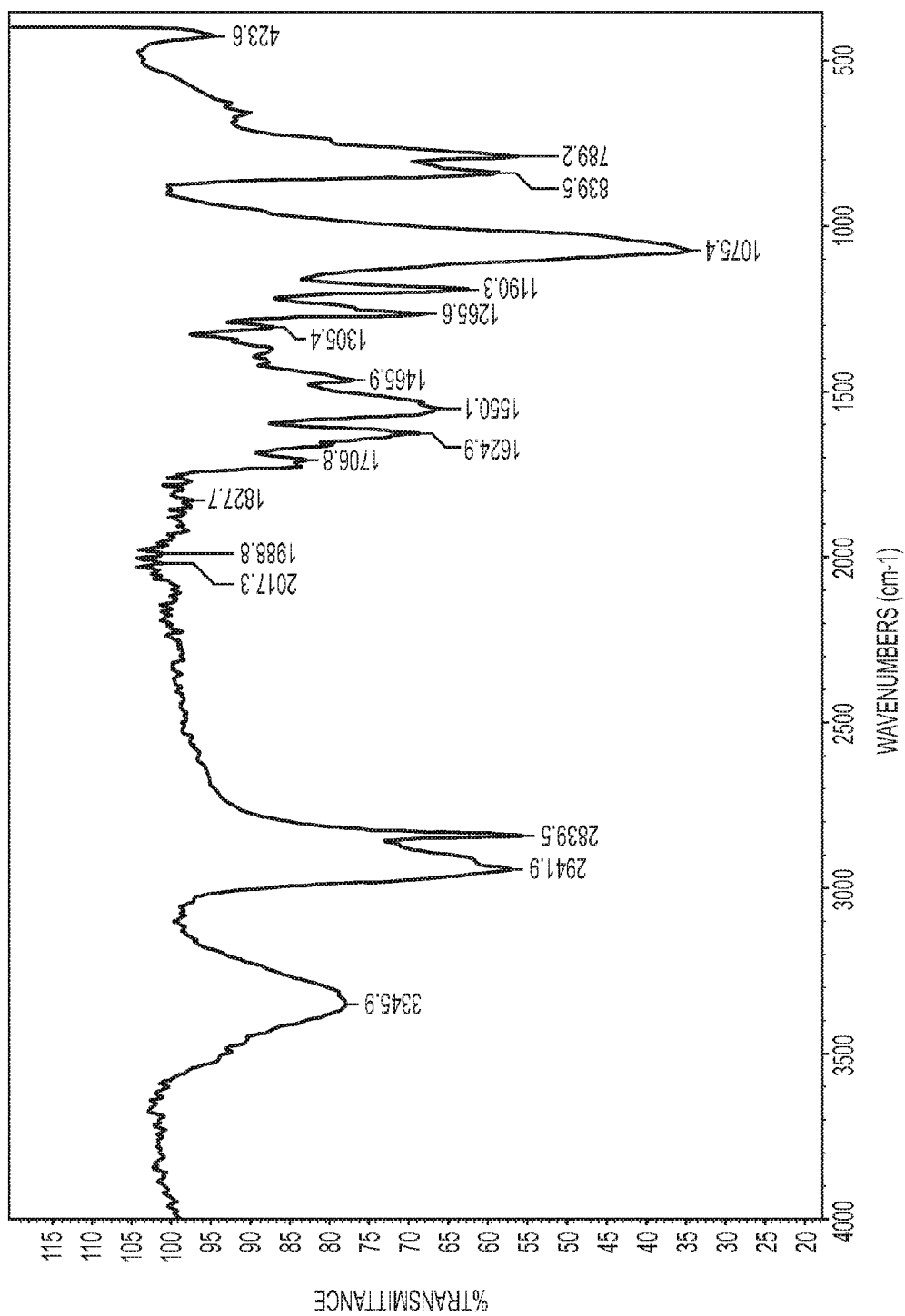
FIG. 3 shows the FTIR spectrum for the hybrid coating C3

As seen in FIG. 3, the FTIR spectrum of coating C3 showed a strong absorption peak at 1075 cm$^{-1}$ that corresponds to Si—O—Si which confirms the condensation reaction between the silanol groups. The disappearance of absorption peak at 905 cm$^{-1}$ for epoxy group indicated that the epoxy groups had reacted with APTMS and is now attached to the silica by a chemical bond. [Weili Li, Dong Huang, XinYu Xing, Jijun Tang, Yujin Xing, Xiujuan Li, Jide Zhang, Study the Factors Affecting the Performance of Organic-Inorganic Hybrid Coatings, *Journal of Applied Polymer Science*, 2014, DOI: 10.1002/APP.41010, incorporated herein by reference in its entirety]. The formation of the urethane moiety can be proved from the absorption peak at 1707 cm$^{-1}$ and the disappearing of any absorption peaks at 2270 cm$^{-1}$ corresponds to unreacted isocyanates. [H. J. Naghash, I. Mohammadidehcheshmeh, M. Mehrnia, Synthesis and characterization of a novel hydroxy terminated polydimethylsiloxane and its application in the waterborne polysiloxane-urethane dispersion for potential marine coatings, *Polym. Adv. Technol.*, 2013, 24, 307-317, incorporated herein by reference in its entirety]. The existence of absorption band at 3346 cm$^{-1}$ indicates that not all the OH groups were consumed during the condensation reaction or it corresponds to the NH groups. The peaks in the range 1400-1600 cm$^{-1}$ correspond to the combination of bending vibration of N—H bond and stretching vibration of C—N bond. The FTIR spectra of all other coatings showed also the above characteristic absorption peaks but with clear shift in their corresponding frequency values. The shift in the IR frequencies of carbonyl groups to lower numbers in all other coatings could be attributed to the hydrogen bonding interaction for these groups with —NH and —OH groups or to the presence of urea content in the coating's composition [E. Yilgor, E. Burgaz, E. Yurtsever and I. Yilgor, Comparison of hydrogen bonding in polydimethylsiloxane and polyether based urethane and urea copolymers, Polymer, 2000, 41, 849-857; K. Wang and C. S. Paik Sung, Fluorescence and IR Characterization of Cure in Polyurea, Polyurethane, and Polyurethane—Urea, Macromolecules, 2002, 35, 883-888—each incorporated herein by reference in its entirety]. More absorption peaks can be observed in the FTIR spectrum of coating C1 that could be assigned to the silane precursor GPTMS in the coating formulation.

Example 5

Nuclear Magnetic Resonance (NMR) Spectroscopy

Figure 4:
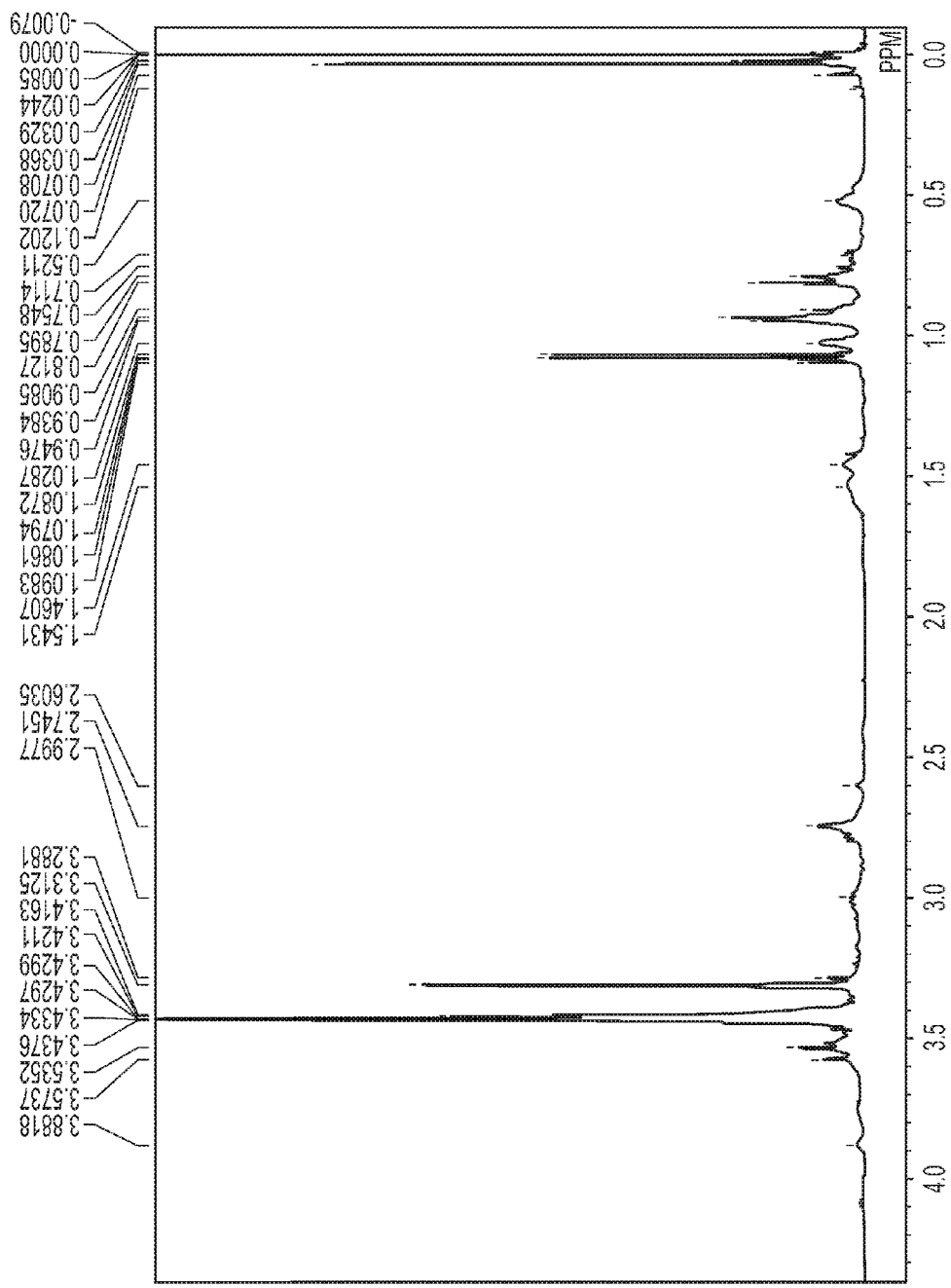
FIG. 4 shows the $^1$H-NMR spectrum for the hybrid coating C3.
Figure 5:
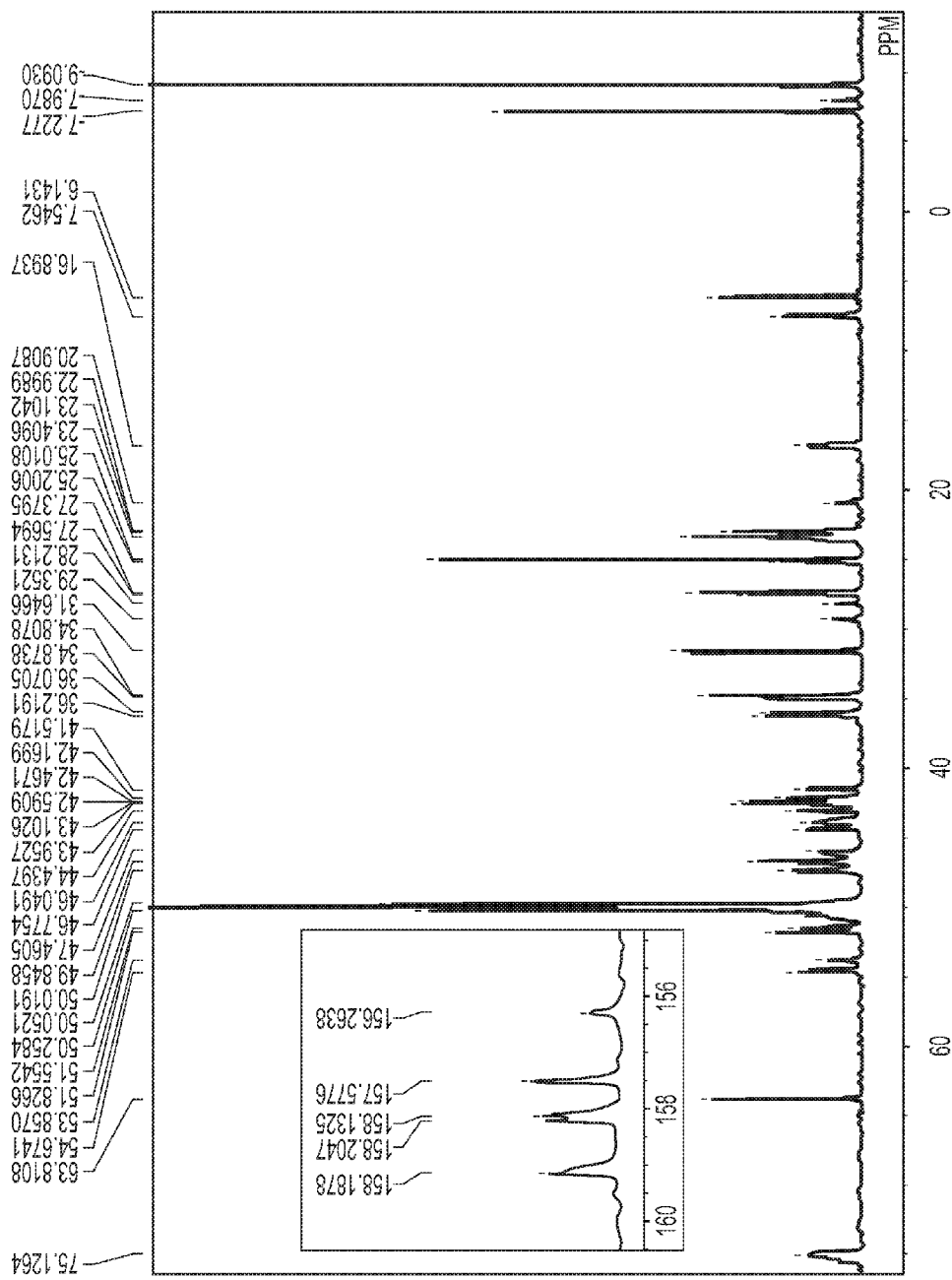
FIG. 5 shows the $^{13}$C-NMR spectrum for the hybrid coating C3.

The hybrid coating compound C3 was subjected to $^1$H-NMR and carbon-13 nuclear magnetic resonance ($^{13}$C-NMR) analyses. $^1$H-NMR spectrum (FIG. 4) showed the disappearance of the chemical shift at 2.60 ppm which is assigned for the proton of the carbon in the oxirane rings. This confirms the occurrence of the reaction between the epoxide groups in DER736 and the amino group in APTMS. This was also confirmed by observing that the chemical shift of the proton in the NCH$_2$ group in the APTMS monomer (2.02 ppm) has now shifted downfield in C4 (2.74 ppm). The presence of small signal at 2.99 ppm in C4 indicates that not all OMe groups in APTMS were hydrolyzed during the sol-gel reaction. The corresponding $^{13}$C-NMR spectrum of C4 is illustrated in FIG. 5. The spectrum shows the carbon in SiCH$_2$ has shifted upfield from 5.8 ppm in the APTMS monomer to −7.2 and −9.1 ppm in C4. [S. Sobhani, A. Jannesari, S. Bastani, Effect of Molecular Weight and Content of PDMS on Morphology and Properties of Silicone-Modified Epoxy Resin, *Journal of Applied Polymer Science*, 2012, 123, 162-178, incorporated herein by reference in its entirety]. The four peaks in the range of 156.3 to 159.1 ppm correspond to different urethane carbonyls in C4 confirming the reaction of the isocyanate groups (no peaks corresponding to the isocyanate carbons is shown in the range 122.0 to 124.0 ppm) in IPDI.

Example 6

Coating of Mild Steel Samples

All coatings were applied (using K101 rod coating applicator) on S-36 mild steel Q-panels sheets and the coated sample dried for an hour and then cured at 100° C. for 48 h in oven.

Figures 6A, 6B, 6C, 6D, 6E:
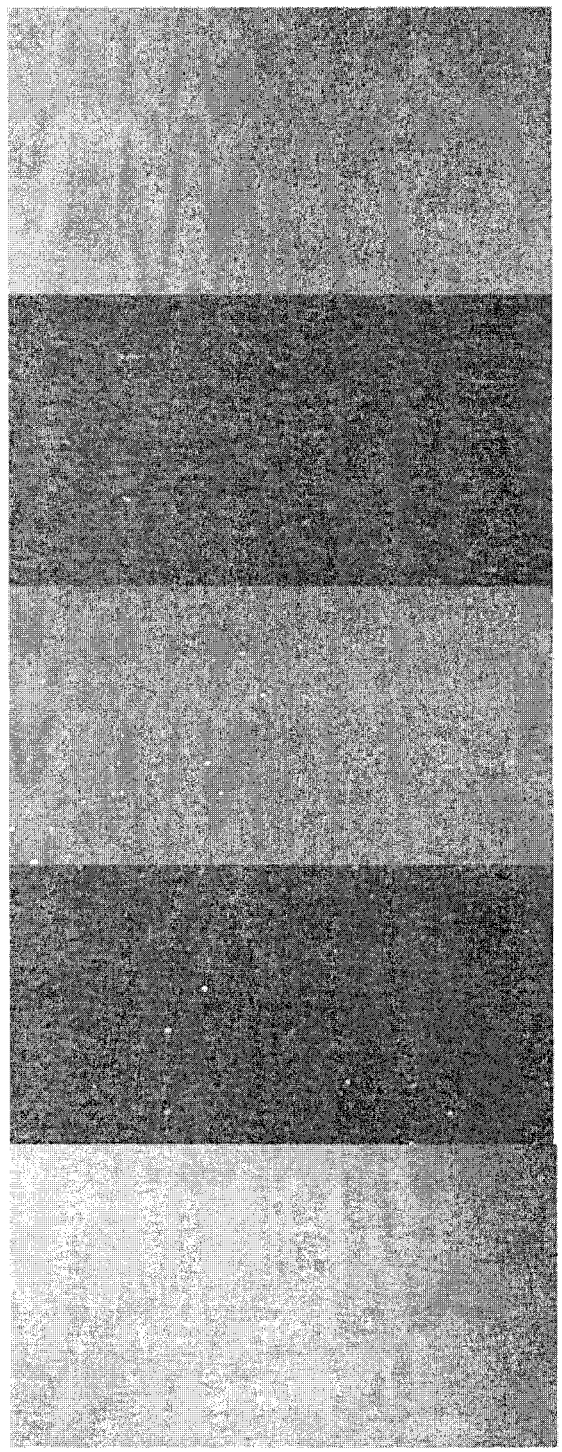
FIG. 6A shows a panel of the coated mild steel sample C0 after curing.
FIG. 6B shows a panel of the coated mild steel sample C1 after curing.
FIG. 6C shows a panel of the coated mild steel sample C2 after curing.
FIG. 6D shows a panel of the coated mild steel sample C3 after curing.
FIG. 6E shows a panel of the coated mild steel sample C4 after curing.

After application and curing of the hybrid coatings C1-C5, the samples appeared very similar and showed no visible signs of corrosion or cracks, as shown in FIGS. 6A-6C. The difference in the original color of the prepared coatings before application on steel panels (colorless for C0, C2 and C4; pale yellow for C1 and C3) causes the slight change in the color of the cured coated samples. The cured samples were subjected then to different thermal, electrochemical, morphological and hardness testing. It is worth mentioning here that the following properties of each individual coating are the average properties of all different polymeric segments forming the formulation of the coating.

Example 7

Thermogravimetric Analysis (TGA) of the Prepared Hybrid Coatings

Figure 7:
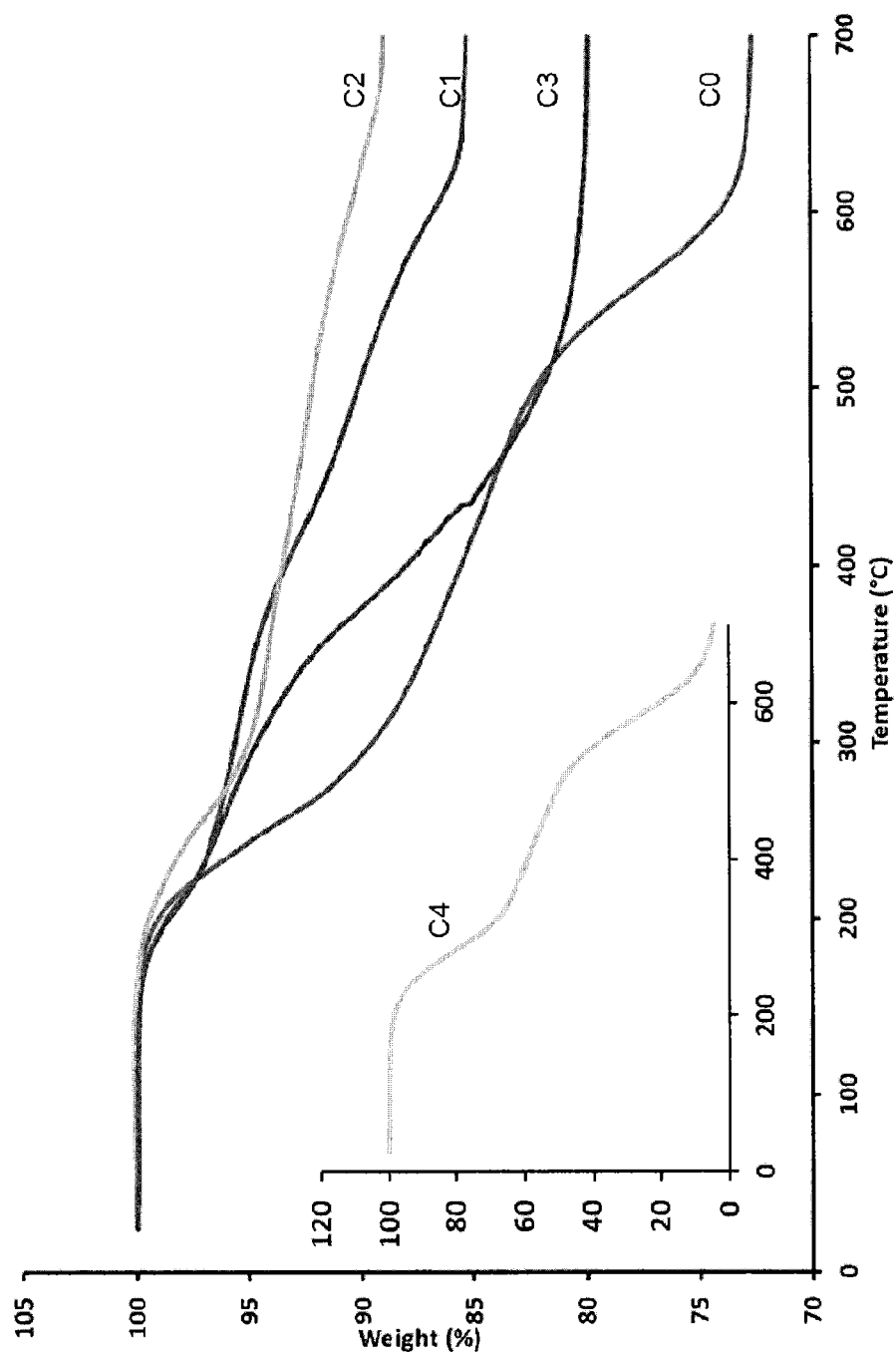
FIG. 7 shows the TGA analysis graphs for the hybrid coatings C0-C4.

The thermal stability of the prepared organic-inorganic hybrid coatings were determined by using TGA analysis. The thermograms for different hybrid coatings are given in FIG. 7. The results revealed that all prepared coatings were characterized by high thermal stability, except for coating C4, which indicated weak crosslinking density for this coating.

The weight losses for C4 take place at three steps: The first step with gradual weight loss from room temperature to around 325° C. is due to the evaporation of physically absorbed solvent and residual monomers, the second weight loss in the range of 325-510° C. is ascribed to the decomposition of polymer, the third minor weight loss at 510-700° C. may be caused by the partial decomposition of silica bonded or entrapped polymeric segments. [Yong-Chun Chen, Shu-Xue Zjou, Hai-Hua Yang and Li-Min Wu, Interaction and Microstructure of Polyurethane/Silica Hybrid Films Prepared by Sol-Gel Process, *Journal of Sol-Gel Science and Technology*, 2006, 37, 39-47, incorporated herein by reference in its entirety]. The weight loss pattern of all other coatings are relatively similar to C4 but with small changes in the corresponding intervals of temperatures and significant lower char yields.

Example 8

Electrochemical Impedance Spectroscopy (EIS) of the Prepared Hybrid Coatings

The protective character of the newly prepared hybrid sol-gel coatings was determined using electrochemical measurements, and in particular the EIS technique. The most outstanding and well-known advantage of this technique is the possible continuous monitoring of the progress of corrosion, with instantaneous corrosion rate measurements, and it can provide information on the reactions mechanisms of the electrochemical deterioration. See N. P. Tavandashti, S. Sanjabi, T. Shahrabi, Evolution of corrosion protection performance of hybrid silica based sol-gel nanocoatings by doping inorganic inhibitor, *Materials and Corrosion,* 2011, 62, 411-415, incorporated herein by reference in its entirety. The impedance response of the system consists of the sol-gel layer, the activity at the substrate/coating interface, and the corrosion process that might take place. The open-circuit impedances of the hybrid sol-gel coated mild steel substrate were traced over 240 h after immersing them continuously into 3.5 wt % NaCl solution.

Figure 8A:
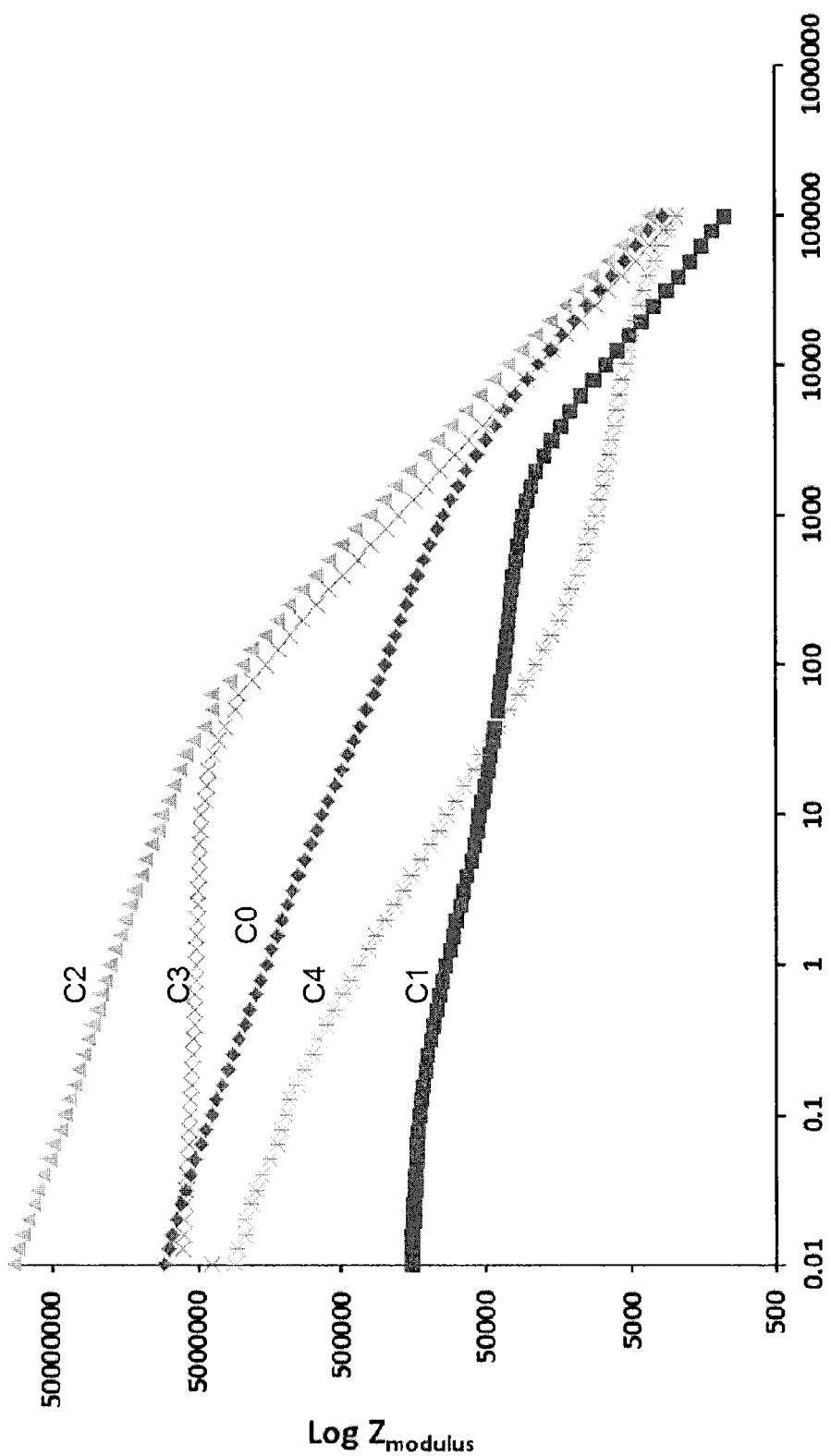
FIG. 8A shows the Bode plots of the hybrid coated mild steel samples C0-C4 after 24 hours immersion in 3.5 wt % NaCl solution.
Figure 8B:
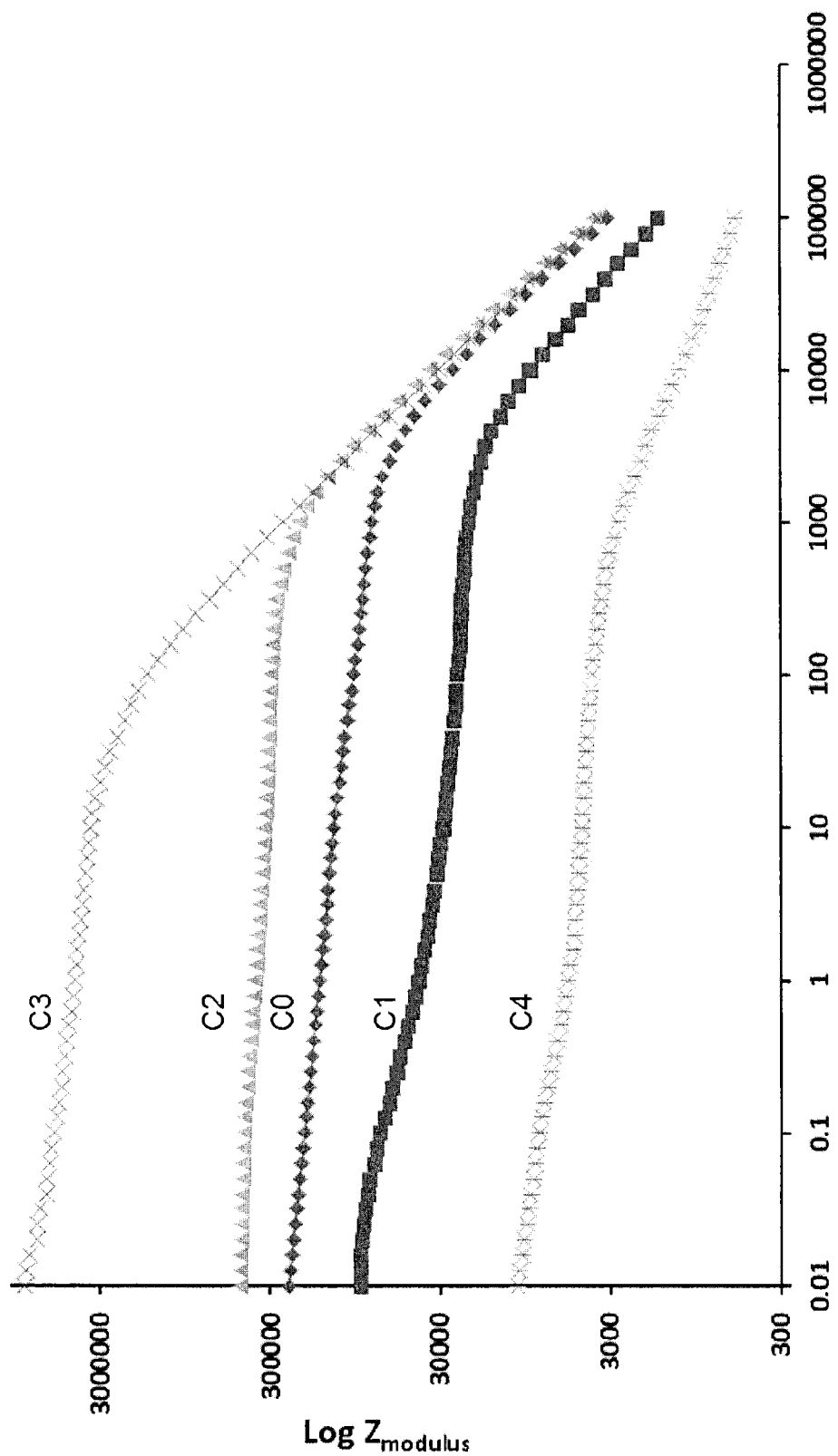
FIG. 8B shows the Bode plots of the hybrid coated mild steel samples C0-C4 after 240 hours immersion in 3.5 wt % NaCl solution.

The electrochemical impedance Bode spectra for all the coatings after 24 and 240 hours of continuous immersion in 3.5 wt % NaCl electrolyte is shown in FIGS. 8A and 8B. EIS data clearly indicated that coatings C2 and C3 provided excellent barrier protection properties for the steel surface at initial immersion time in NaCl solution. Initially, the C2 coated sample showed the highest corrosion resistance value (about $10^7$ $\Omega cm^2$) among all the coated samples (FIG. 8A). Interestingly, only sample C3 showed no significant change in its corrosion resistance value ($8.2 \times 10^6$ $\Omega cm^2$) after 240 hours of immersion, indicating a minor loss of the corrosion protection properties of this coating. The impedance values for the other coatings were in the following order: C2 ($4.5 \times 10^6$ $\Omega cm^2$)>C0 ($2.3 \times 10^5$ $\Omega cm^2$)>C1 ($8.8 \times 10^4$ $\Omega cm^2$)>C4 ($1.0 \times 10^4$ $\Omega cm^2$) (FIG. 8B). The low impedance value for coating C4 at longer immersion times in NaCl revealed the failure of this coating in protecting steel surface from corrosion. (FIG. 8B).

Figure 9A:
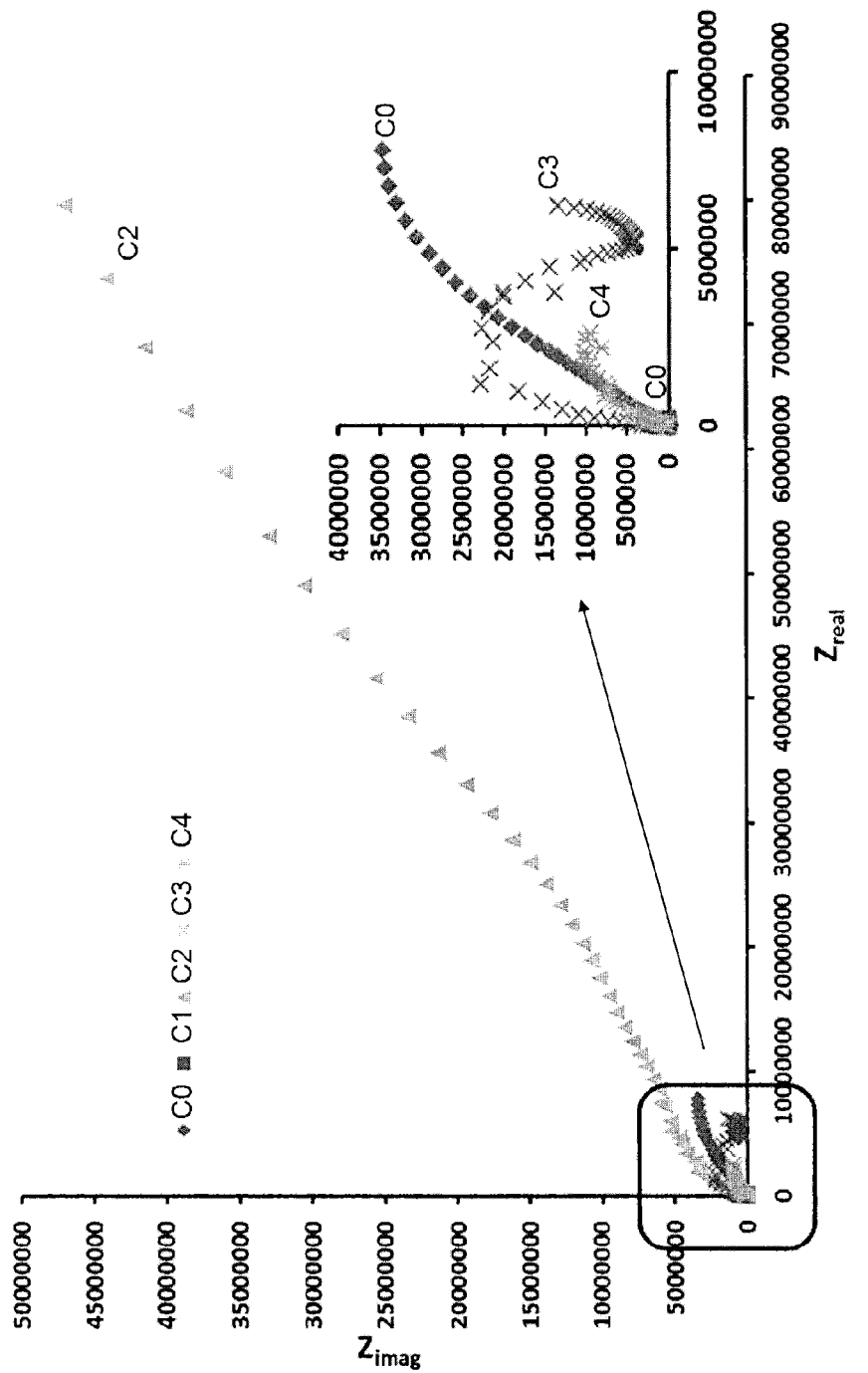
FIG. 9A shows the Nyquist plots of the hybrid coated mild steel samples C0-C4 after 24 hours immersion in 3.5 wt % NaCl solution. An exploded view of the Nyquist plots for C0, C1, C3 and C4 is provided on the bottom right corner of the figure.
Figure 9B:
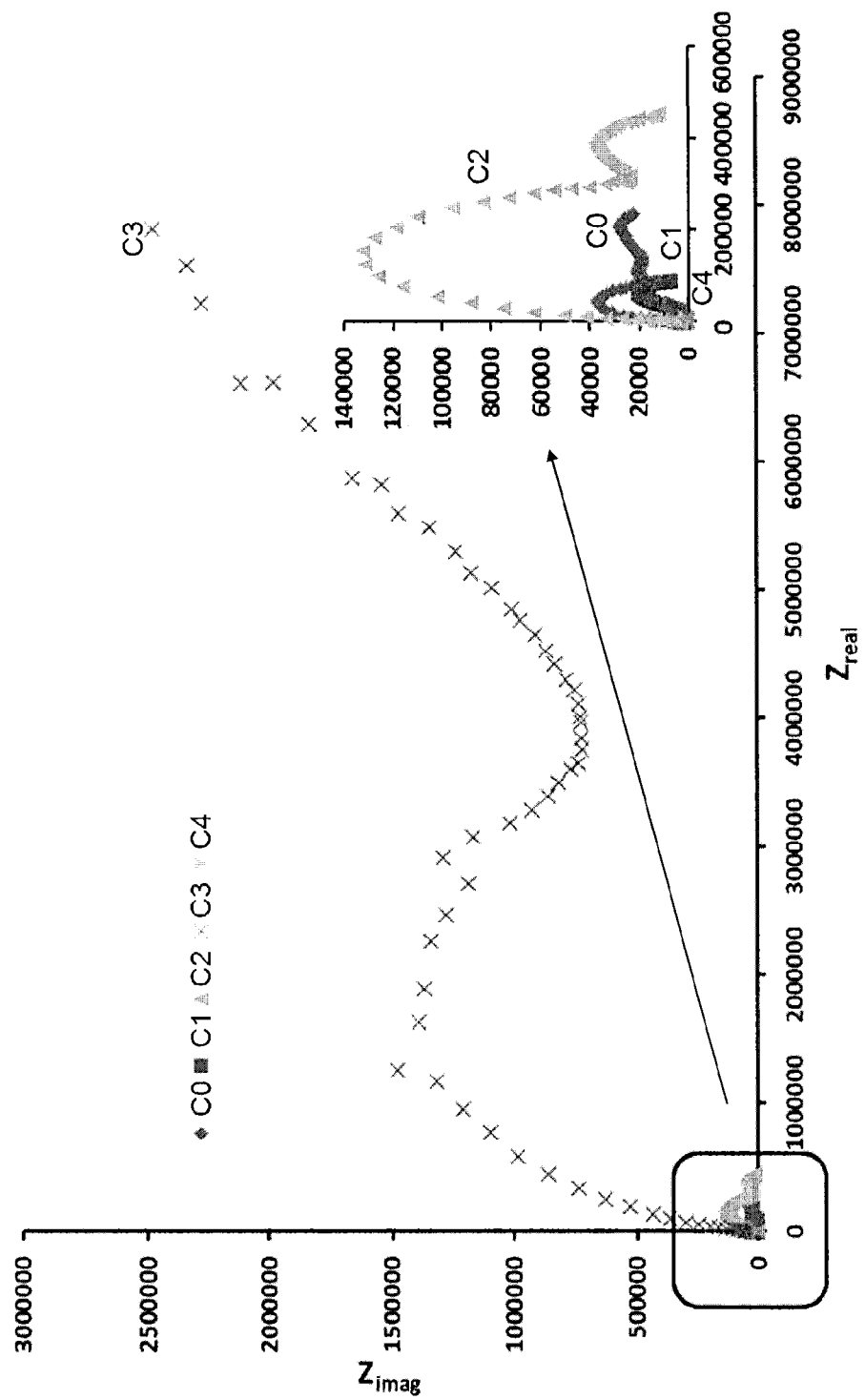
FIG. 9B shows the Nyquist plots of the hybrid coated mild steel samples C0-C4 after 240 hours immersion in 3.5 wt % NaCl solution. An exploded view of the Nyquist plots for C0, C1, C2 and C4 is provided on the bottom right corner of the figure.

FIGS. 9A and 9B represent the EIS Nyquist spectra of the hybrid sol-gel mild steel coated samples after 24 and 240 hours of immersion in the electrolyte solution, respectively. Nyquist plot of the coated sample C2 after 24 hours of immersion indicated the presence of only one capacitive arc, which implied that the coating acts as intact capacitor prohibiting permeation of corrosive species such as water, oxygen, and other ions towards the surface of the metal substrate (FIG. 9A). FIG. 9A shows that the corrosion resistance of this coating is higher than all other samples. The Nyquist plots of other coated samples showed two-time constant semicircles with depressed and full capacitive first loop for each coating at higher frequencies. Larger diameters of Nyquist semi-circles are attributed of higher corrosion resistance coatings. At prolonged immersion periods, the Nyquist plots (FIG. 9B) showed that the highest corrosion resistance is now for C3. For samples C1 and C2, there is a presence of a semicircle at low frequencies in the Nyquist plot, suggesting the onset of electrochemical reactions at the metal/coating interface. The relatively high resistances of the C3 coating and its stability over the long immersion period confirmed its barrier protection properties.

Example 9

Direct Current (DC) Polarization Scanning of the Prepared Hybrid Coatings

Figure 10:
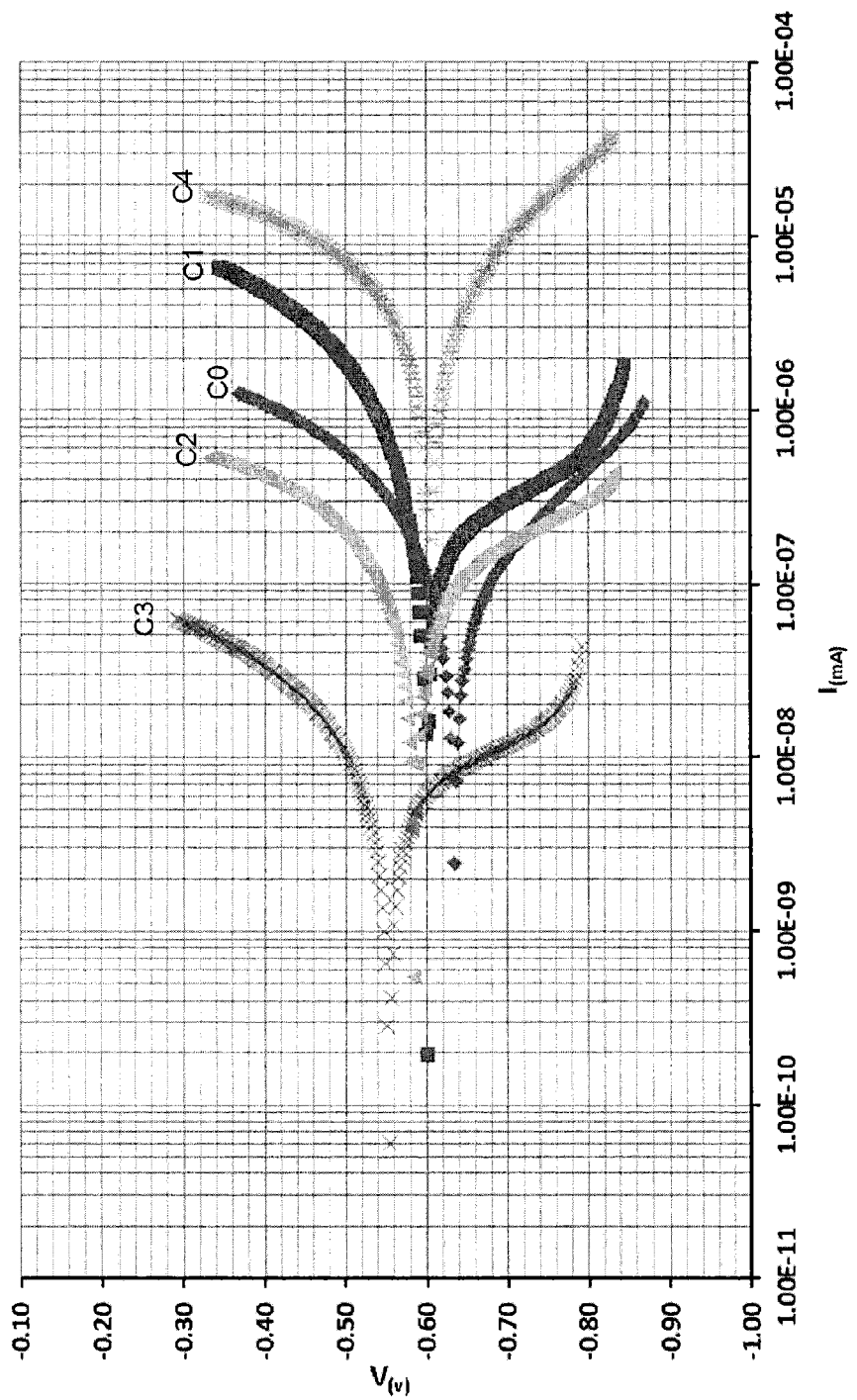
FIG. 10 shows the DC polarization scans of the hybrid coated mild steel samples C0-C4 after 240 hours immersion in 3.5 wt % NaCl solution.
Figure 13A:
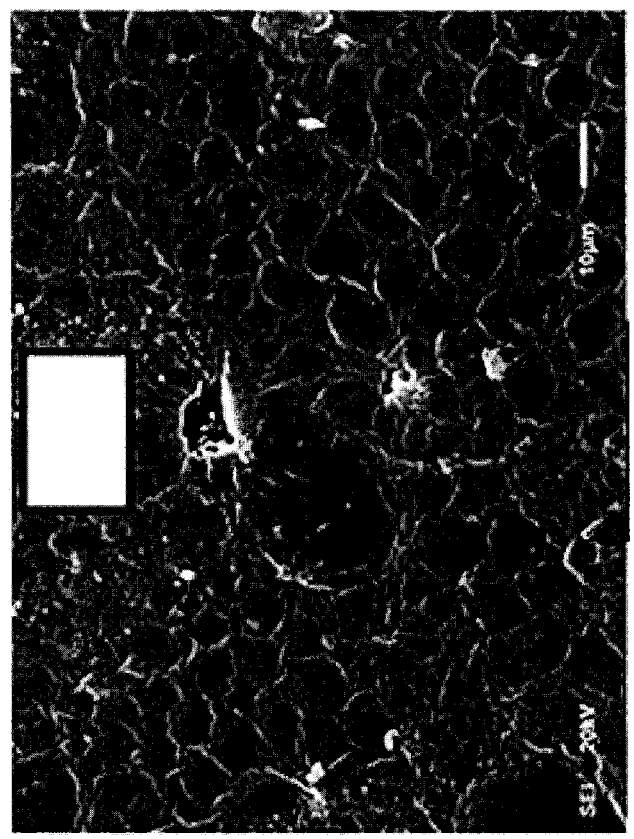
FIG. 13A is an SEM micrograph of the top surface of the hybrid coated sample C0 after immersion in 3.5 wt % NaCl for 10 days.
Figures 13B, 13C:
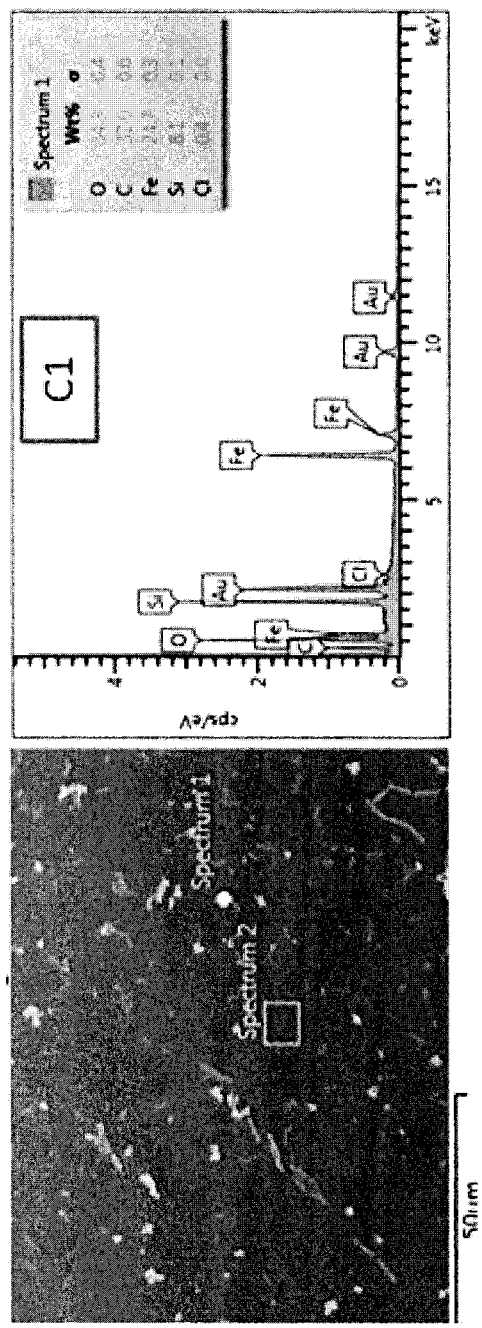
FIG. 13B is an SEM micrograph of the top surface of the hybrid coated sample C1 after immersion in 3.5 wt % NaCl for 10 days.
FIG. 13C is an EDS analysis spectrum 1 based on the single point on the top surface of the hybrid coated sample C1 after immersion in 3.5 wt % NaCl for 10 days, indicated in FIG. 13A as "Spectrum 1".
Figures 13D, 13E:
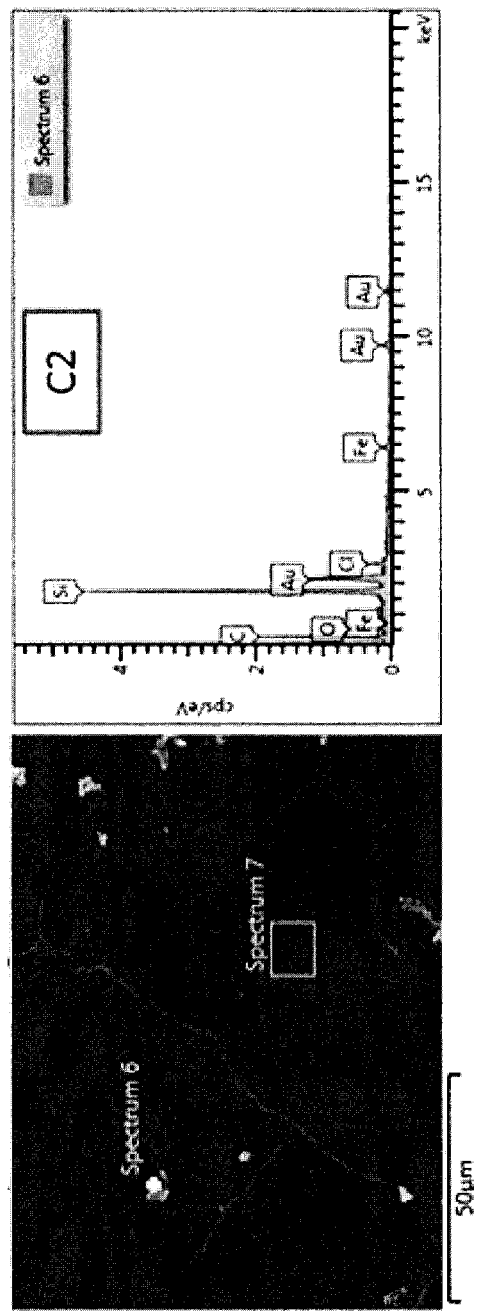
FIG. 13D is an SEM micrograph of the top surface of the hybrid coated sample C2 after immersion in 3.5 wt % NaCl for 10 days.
FIG. 13E is an EDS analysis spectrum 6 based on the single point on the top surface of the hybrid coated sample C2 after immersion in 3.5 wt % NaCl for 10 days, indicated in FIG. 13C as "Spectrum 6".
Figures 13F, 13G:
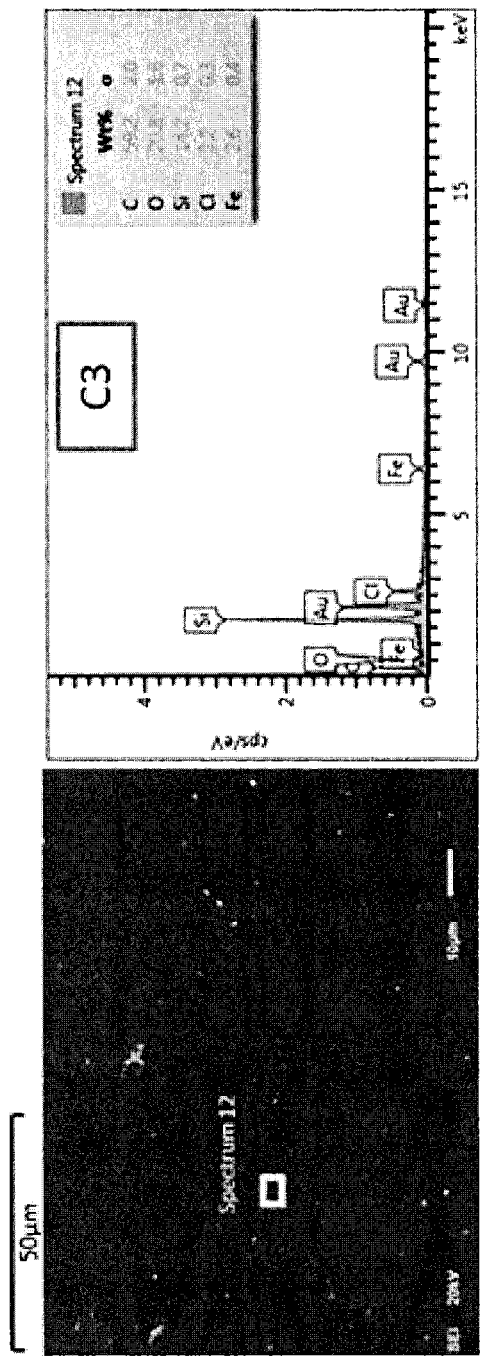
FIG. 13F is an SEM micrograph of the top surface of the hybrid coated sample C3 after immersion in 3.5 wt % NaCl for 10 days.
FIG. 13G is an EDS analysis spectrum 12 based on the single point on the top surface of the hybrid coated sample C3 after immersion in 3.5 wt % NaCl for 10 days, indicated in FIG. 13E as "Spectrum 12".
Figures 13H, 13I:
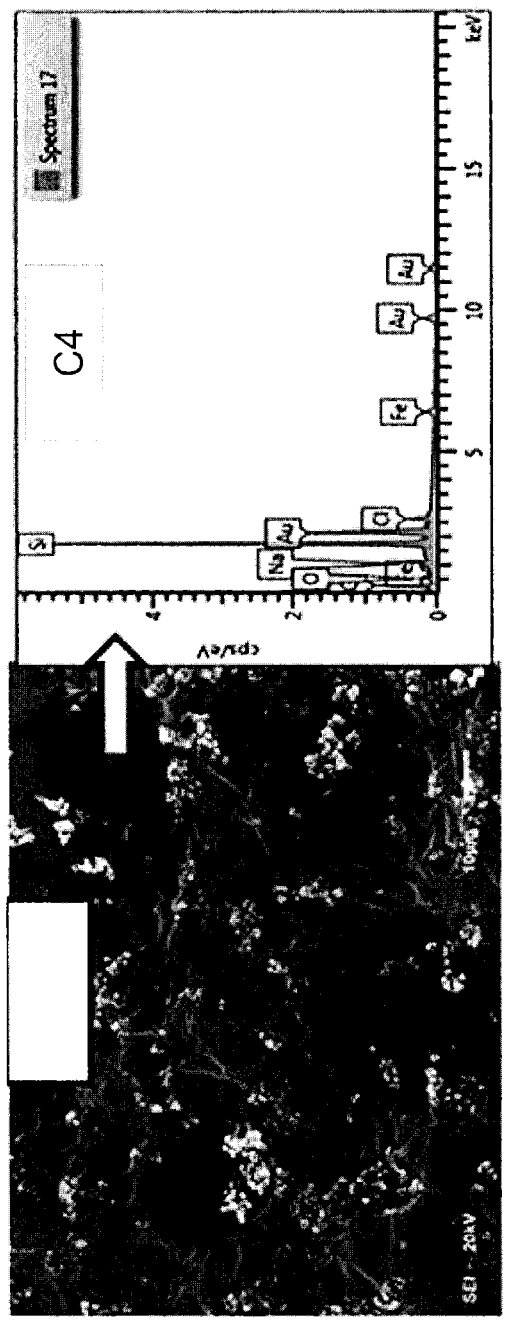
FIG. 13H is an SEM micrograph of the top surface of the hybrid coated sample C4 after immersion in 3.5 wt % NaCl for 10 days.
FIG. 13I is an EDS analysis spectrum 17 based on the single point on the top surface of the hybrid coated sample C3 after immersion in 3.5 wt % NaCl for 10 days, indicated in FIG. 13E as "Spectrum 17".

The polarization curves of the hybrid coated mild steel samples after 240 h immersion in 3.5 wt % NaCl solution are shown in FIG. 10. and the electrochemical characteristics derived from these curves are listed in Table 2. The results showed that the corrosion current ($I_{corr}$) of sample C3 is much less than all other samples, which confirmed the excellent barrier properties of this hybrid coating. This result indicates that C3 probably has the greatest crosslinked structure among the prepared coatings. Considering the data displayed in Table 2, it was evident that the results of polarization tests were consistent with those of impedance measurements in which sample C3 showed the best corrosion protection performance on mild steel substrate, while sample C4 showed the poorest performance. The poor performance of C4 can be attributed to the formation of a less dense and porous coating's film on the surface of steel.

TABLE 2

Electrochemical characteristics of the hybrid coated mild steel samples after 240 h of immersion in 3.5 wt. % NaCl solution.

| | Sample | | | | |
|---|---|---|---|---|---|
| | C0 | C1 | C2 | C3 | C4 |
| $E_{corr}$ (mV) | −633 | −601 | −584 | −533 | −603 |
| $I_{corr}$ (A cm$^2$) | $1.04 \times 10^{-7}$ | $2.55 \times 10^{-7}$ | $1.19 \times 10^{-7}$ | $1.94 \times 10^{-8}$ | $1.42 \times 10^{-6}$ |

Example 10

Digital Photo Imaging of Mild Steel Samples Coated with Hybrid Coatings C1-C5 Before and after Immersion in Salt Solution The photo digital imaging of all coated samples after immersing them continuously for 10 days in 3.5 wt % NaCl solution (FIGS. 11A-11F) confirmed the conclusion drawn from the electrochemical data. No sample showed signs of advance corrosion on their surfaces Samples C1 and C2 showed the presence of some salt aggregates adsorbed on their surfaces (FIGS. 11A, 11B, 11D and 11E). The surface of sample C3 remained intact with no sign of corrosion or coating delamination (FIGS. 11C and 11F).

Example 11

Contact Angle Measurements of the Prepared Hybrid Coatings

Contact angle is an important parameter to evaluate the surface of hybrid coatings. The contact angle values for the hybrid coatings before and after immersion in 3.5 wt % NaCl for 10 days are shown in FIGS. 12A-12F. Although the surface of the coated sample C3 has the lowest hydrophobic character (due to the less organic functionalities in this coating) among all other coated samples, it showed less wetting (following the drop in contact angle values before and after immersion, FIGS. 12C and 12F) behavior comparing to the other samples, which explains the anticorrosive property of this coating. The loss in the hydrophobicity of surfaces is an indication for wetting the hybrid coatings with electrolyte solution which leads eventually to the onset of corrosion. [H. R. Jeon, J. H. Park, M. Y. Shon, Corrosion protection by epoxy coating containing multi-walled carbonnanotubes. *Journal of Industrial and Engineering Chemistry*, 2013, 19, 849-853, incorporated herein by reference in its entirety].

Example 12

Scanning Electron Microscopy (SEM) and Energy Dispersive X-Ray (EDX) Spectroscopy of Mild Steel Samples Coated with Hybrid Coatings FIGS. 13A, 13B, 13D, 13F and 13H show SEM micrographs of the top surface of the fractured surfaces of mild steel samples coated with one of C0-C4 hybrid coatings, respectively. The EDX analyses of C1-C4 hybrid coatings, as shown in the spectra of FIGS. 13C, 13E and 13G and 13I, respectively, confirmed the application of the coatings on the substrate due to the appearance of carbon, oxygen and silicon elements. A smooth and featureless morphology was observed for C3. The surface of C0, C2 and C4 appeared to consist of two or more phases that are dispersed in the coating matrix, indicating the occurrence of different competitive polymeric reaction during the preparation of these coatings. The surface of sample C1 showed the shape of regular non-porous coatings with the presence of some coating particles that did not crosslink with the bulk of the coating and existed on the surface of the coating layer already attached to the metal. The surface of samples C0 and C4 appeared rough with small cracks and some NaCl salt precipitation on them. The nature of these particles was elucidated using single point EDS analysis of the coated sample. The above results are in full agreement with electrochemical tests which proved the C3 sample to have the best barrier properties among all other prepared coatings.

FIGS. 14A-14E show the typical SEM micrographs of cross sections of the hybrid sol-gel coated mild steel samples. It was observed that the C3 coating is perfectly bonded with no sign of any defects such as corrosion and coating delamination. C1 and C2 showed presence of some salt aggregates adsorbed on their surfaces. C0 and C4 showed signed of advance corrosion on their surfaces.

Example 13

Nanoindentation Analysis of the Prepared Hybrid Coatings

Nanoindentation analysis was used to evaluate the hardness of the prepared coatings and obtained results are presented in Table 3. The high hardness of sample C3 revealed the existence of a higher sol-gel density in this coating comparing to other coatings, which supported and explained the interesting anticorrosive properties of this coating. The similarity in the profile of both mechanical and the anticorrosion properties was also visible with other coatings except for sample C4, where the hardness value was affected by the hardness properties from steel substrate. This interference can be attributed to the thin film this coating formed on the steel surface [H. Ichimura and I. Ando, Mechanical properties of arc-evaporated CrN coatings: Part I—nanoindentation hardness and elastic modulus, Surf. Coat. Technol., 2001, 145, 88-93—incorporated herein by reference in its entirety].

TABLE 3

Nanoindentation Hardness and Thickness of the hybrid coatings.

| Sample | Nanoindentation hardness (GPa)* | Contact Depth (mm)* | Thickness (mm)** |
|---|---|---|---|
| C0 | 0.55 ± 0.01 | 14 ± 0.01 | 74 |
| C1 | 0.23 ± 0.01 | 11 ± 0.5 | 115 |
| C2 | 1.35 ± 0.06 | 11 ± 0.1 | 140 |
| C3 | 3.47 ± 0.03 | 4 ± 0.1 | 122 |
| C4 | 7.36 ± 1.5 | 7 ± 1.7 | 40 |

*Determined using a load of 50 mN (average of 4 measurements).
**Obtained from cross-sectional SEM analyses.

Example 14

Adhesion Tests

Figure 15:
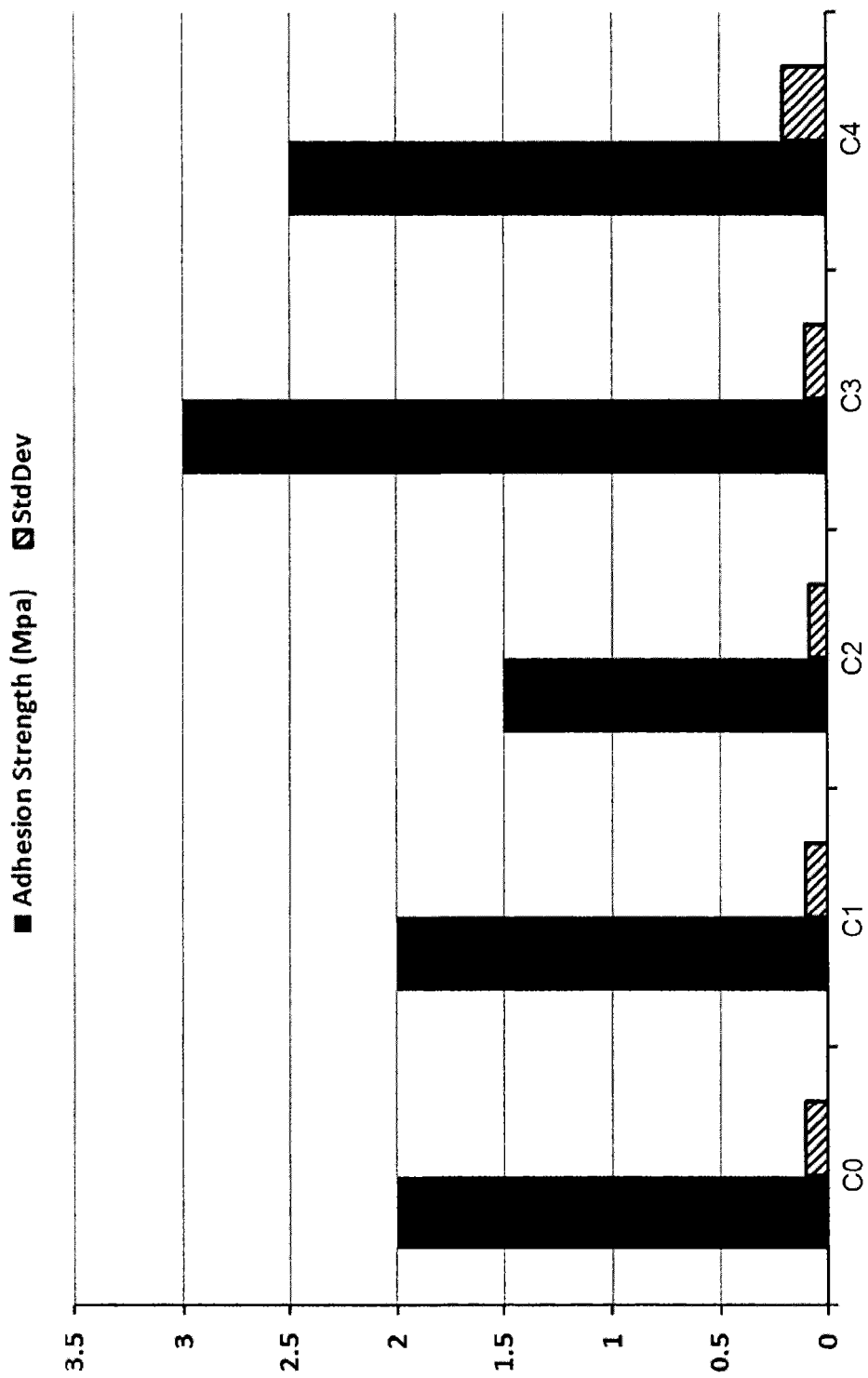
FIG. 15 is a bar graph showing adhesion strengths (in MPa, average of 3 measurements) of hybrid coatings C0-C4.

The adhesion capacity of all the coatings was measured using the pull-off hydraulic adhesion tester. Results in FIG. 15 indicated clearly the superior adhesion strength of C3 as compared to other coatings. This can be explained by the availability of more free Si—OH groups in this coating to bond to steel metal [M.-C. Brochier Salon and M. N. Belgacem, Competition between hydrolysis and condensation reactions of trialkoxysilanes, as a function of the amount of water and the nature of the organic group, Colloids Surf., A, 2010, 366, 147-154—incorporated herein by reference in its entirety].

The superior anticorrosive, hardness and adhesion properties of C3 can be attributed to the powerful ability of the APTMS cross-linker to contribute effectively and simultaneously in both the coupling and the hydrolysis/polycondensation reactions. This led ultimately to the production of a homogeneous coating with high crosslink density, while the other two considered aminosilanes applied in the present disclosure were characterized by a low cross-link density that provides pathways for the diffusion of corrosive species to the coating/metal interface.

Figures 16A, 16B, 16C:
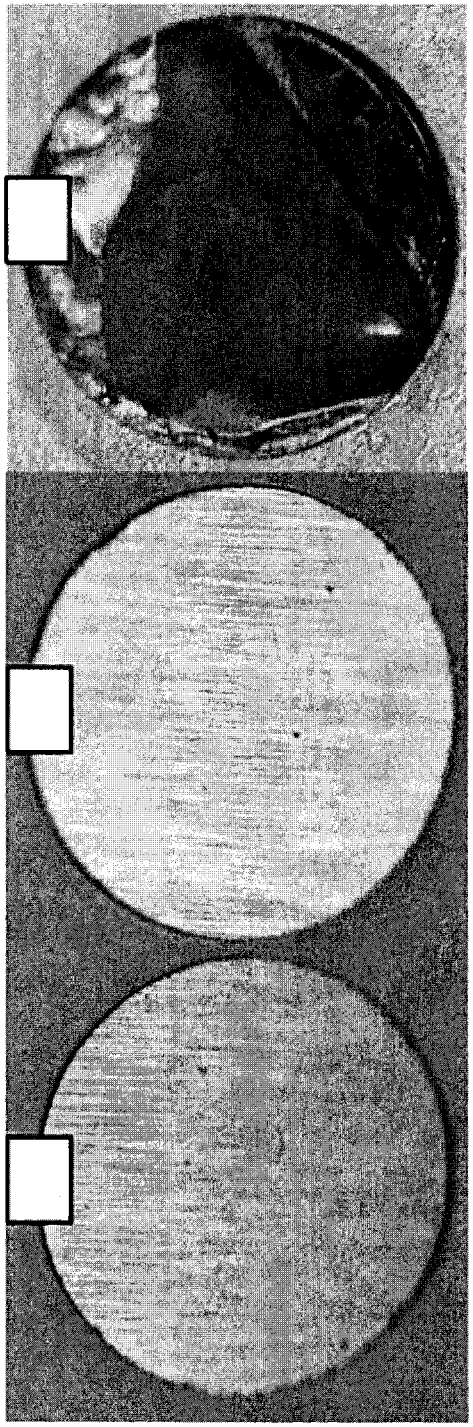
FIG. 16A shows a C3 coated steel panel after two weeks of immersion in 3.5 wt. NaCl.
FIG. 16B shows a C3 coated steel panel after two weeks of immersion in 2 M $H_2SO_4$.
FIG. 16C shows a C3 coated steel panel after two weeks of immersion in 1 M HCl.

In order to explore the protection performance of C3 in other aggressive media and at longer immersion time, completely cured C3 coated steel panels were immersed continuously in 3.5 wt % NaCl, 2 M $H_2SO_4$ and 1 M HCl electrolytes for two weeks. Photodigital images of the immersed panels (FIGS. 16A-16C) showed clearly that the two coated panels immersed in NaCl and $SO_4^{2-}$ electrolytes (FIGS. 16A and 16B, respectively) remained intact indicating an excellent corrosion protection performance of C3 on steel surface in these two testing media. The opposite behavior was observed with the sample immersed in the HCl solution (FIG. 16C) where the steel surface suffered from the occurrence of both general corrosion and delamination of coating behaviors.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A sol-gel composite resin, comprising 10.0-65.0% by weight of siloxane groups relative to the total weight of the composite resin,
   wherein the composite resin is obtained as a reaction product of a reaction mixture comprising, relative to the total volume of the reaction mixture:
   3.0-15.0 vol. % of a liquid polyglycol epoxide;
   10.0-30.0 vol. % of an aminosilane, wherein the aminosilane is at least one selected from the group consisting of (3-aminopropyl)-trimethoxysilane (APTMS), (3-aminopropyl)-triethoxysilane (APTES), (3-aminopropyl)-diethoxy-methylsilane (APDEMS), (3-aminopropyl)-dimethoxy-methylsilane (APDMMS), (3-aminopropyl)-diethoxy-ethylsilane (APDEES), (3-aminopropyl)-dimethoxy-ethylsilane (APDMES), aminopropyl terminated polydimethylsiloxane (APT-PDMS), aminopropyl terminated polydiethylsiloxane (APT-PDES) and aminopropylmethylsiloxane-dimethylsiloxane (APM-DMS);
   25.0-70.0 vol. % of an alkoxysilane, wherein the alkoxysilane is at least one selected from the group consisting of methyltrimethoxysilane (MTMS), methyltriethoxysilane (MTES), ethyltrimethoxysilane (ETMS), ethyltriethoxysilane (ETES), (3-glycidoxypropyl)-trimethoxysilane (GPTMS), (3-glycidoxypropyl)-triethoxysilane (GPTES), tetrarmethoxysilane (TMOS) and tetraethoxysilane (TEOS); and
   5.0-25.0 vol. % of an isocyanate, wherein the isocyanate is at least one selected from the group consisting of methyl isocyanate (MIC), toluene diisocyanate (TDI), methylene diphenyl diisocyanate (MDI), hexamethylene diisocyanate (HDI) and isophorone diisocyanate (IPDI), and
   wherein the siloxane groups are formed by hydrolysis of the aminosilane and the alkoxysilane into silanol groups and polycondensation of the silanol groups.

2. The sol-gel composite resin of claim 1, further comprising 20.0-75.0% by weight of urethane moieties relative to the total weight of the composite resin;
   wherein the urethane moieties are formed between the isocyanate and hydroxyl groups formed by coupling of the liquid polyglycol epoxide and the aminosilane.

3. The sol-gel composite resin of claim 1, wherein the liquid polyglycol epoxide is selected from the group consisting of poly(ethylene glycol) diglycidyl ether, poly(propylene glycol) diglycidyl ether and poly(butylene glycol) diglycidyl ether.

4. The sol-gel composite resin of claim 1, wherein the reaction product is obtained with 1.0-10.0 vol.% of a strong, inorganic acid solution, relative to the total volume of the reaction mixture.

5. The sol-gel composite resin of claim 1, wherein the reaction product is obtained with 30.0-40.0 vol.% of a non-aqueous solvent, relative to the total volume of the reaction mixture.

6. The sol-gel composite resin of claim 1, wherein the reaction mixture comprises, relative to the total volume of the reaction mixture:
   6.0-10.0 vol. % of poly(propylene glycol) diglycidyl ether;
   15.0-25.0 vol. % of an aminosilane selected from the group consisting of 3-aminopropyl)-trimethoxysilane (APTMS), aminopropyl terminated polydimethylsiloxane (APT-PDMS) and aminopropylmethylsiloxane-dimethylsiloxane (APM-DMS);
   30.0-50.0 vol. % of tetraethoxysilane (TEOS) or methyltrimethoxysilane (MTMS); and
   12.5-18.5 vol. % of isophorone diisocyanate.

7. The sol-gel composite resin of claim 1, wherein the reaction mixture comprises, relative to the total volume of the reaction mixture:
   8.0-10.0 vol. % of poly(propylene glycol) diglycidyl ether;
   17.5-22.5 vol. % of an aminosilane selected from the group consisting of 3-aminopropyl)-trimethoxysilane (APTMS), aminopropyl terminated polydimethylsiloxane (APT-PDMS) and aminopropylmethylsiloxane-dimethylsiloxane (APM-DMS);
   17.5-22.5 vol. % of (3-glycidoxypropyl)-trimethoxysilane (GPTMS);
   37.5-42.5 vol. % of methyltrimethoxysilane (MTMS); and
   8.0-8.5 vol. % of isophorone diisocyanate.

8. The sol-gel composite resin of claim 1, having a corrosion resistance of $10^3$-$10^{10}$ $\Omega$ cm$^2$.

9. The sol-gel composite resin of claim 1, having a corrosion current of $10^{-5}$-$10^{-10}$ mA.

10. The sol-gel composite resin of claim 1, having a hardness of 0.1 GPa to 5.0 GPa when coated and cured on a mild steel substrate.

11. A process for preparing the sol-gel composite resin of claim 1, comprising:
    mixing the aminosilane, the alkoxysilane, and the liquid polyglycol epoxide to form an epoxy-silane mixture; and
    mixing the isocyanate with the epoxy-silane mixture.

12. The process of claim 11, wherein the mixing of the aminosilane, the alkoxysilane, and the liquid polyglycol epoxide further comprises:
    mixing the aminosilane, and the alkoxysilane to form a silane mixture; and
    mixing the liquid polyglycol epoxide with the silane mixture to form an epoxy-silane mixture.

13. The process of claim 12, further comprising at least one of:
    mixing an acid solution with the silane mixture or the epoxy-silane mixture; and
    mixing a non-aqueous solvent with the silane mixture or the epoxy-silane mixture.

14. A coating composition, comprising:
    the sol-gel composite resin of claim 1;
    optionally one or more of dye compounds and/or color pigments; and
    optionally one or more active corrosion inhibitors.

15. A mild steel substrate comprising the sol-gel composite resin of claim 1 coated and cured, on at least one surface of the substrate to form a thin film coating.

16. A method for protecting a mild steel substrate against corrosion, comprising:
    coating, on at least one surface of the substrate, with the sol-gel composite resin of claim 1 and curing the sol-gel composite resin on the surface to form a thin film coating.

* * * * *